PACKET DISPENSING MECHANISM
Filed Nov. 24, 1961 10 Sheets-Sheet 1
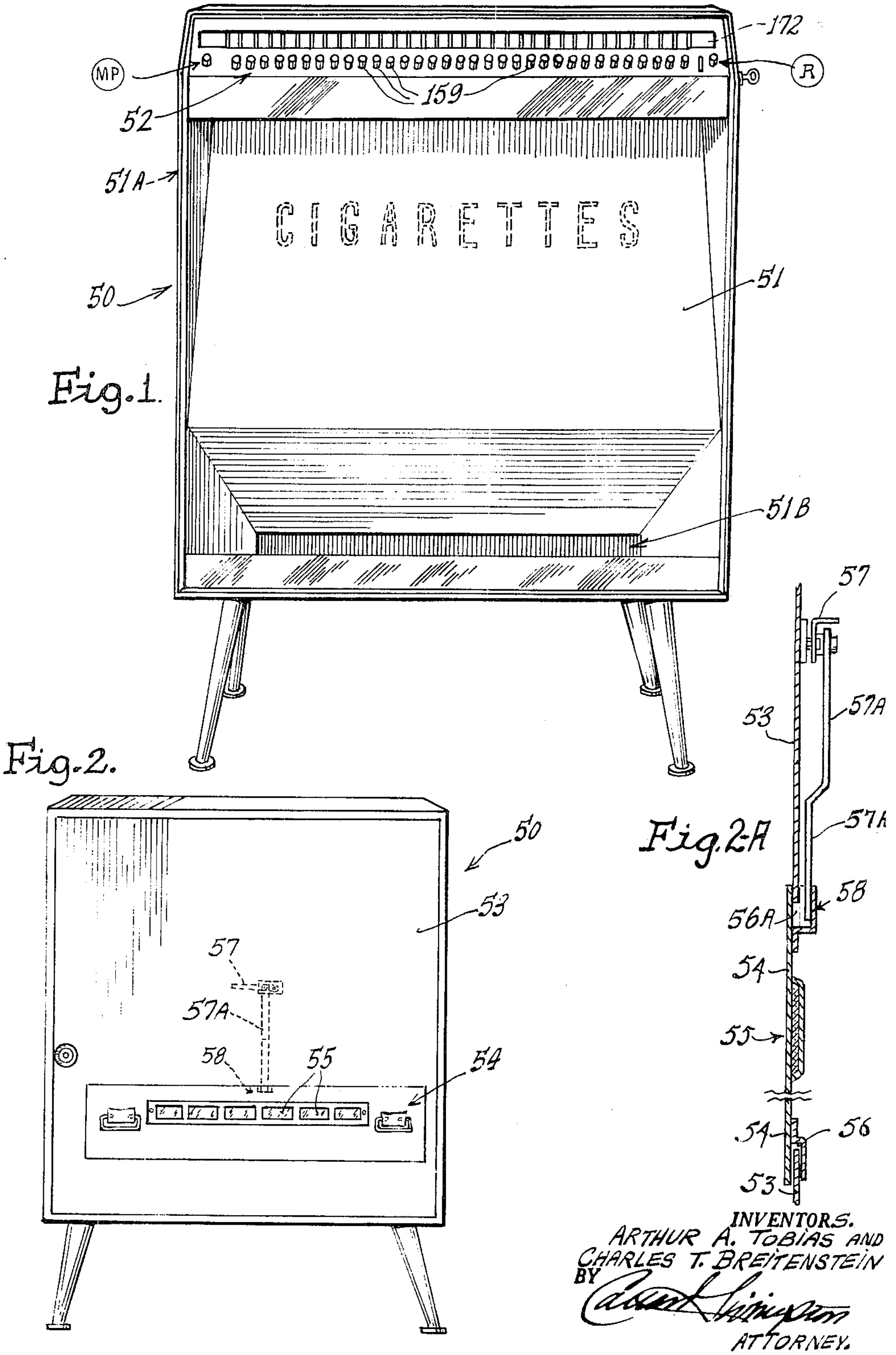
Fig. 1. Fig. 2. Fig. 2-A
INVENTORS.
ARTHUR A. TOBIAS AND
CHARLES T. BREITENSTEIN
BY
ATTORNEY.

INVENTORS.
ARTHUR A. TOBIAS AND
BY CHARLES T. BREITENSTEIN

ATTORNEY.

PACKET DISPENSING MECHANISM

Filed Nov. 24, 1961

INVENTORS.
ARTHUR A. TOBIAS AND
CHARLES T. BREITENSTEIN
ATTORNEY.

Fig. 6.
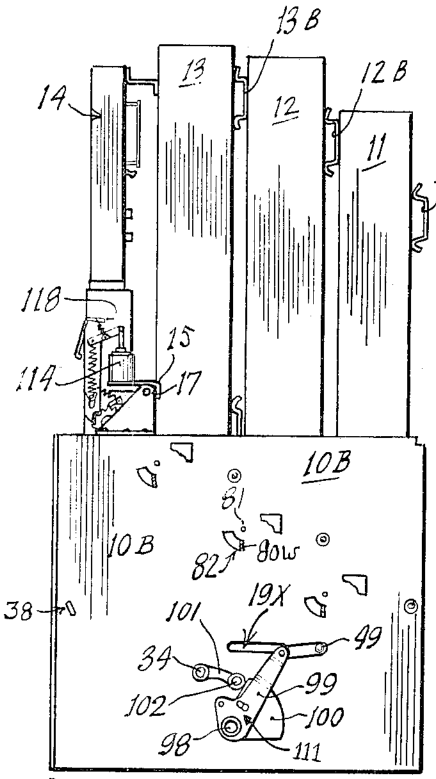
Fig. 8.
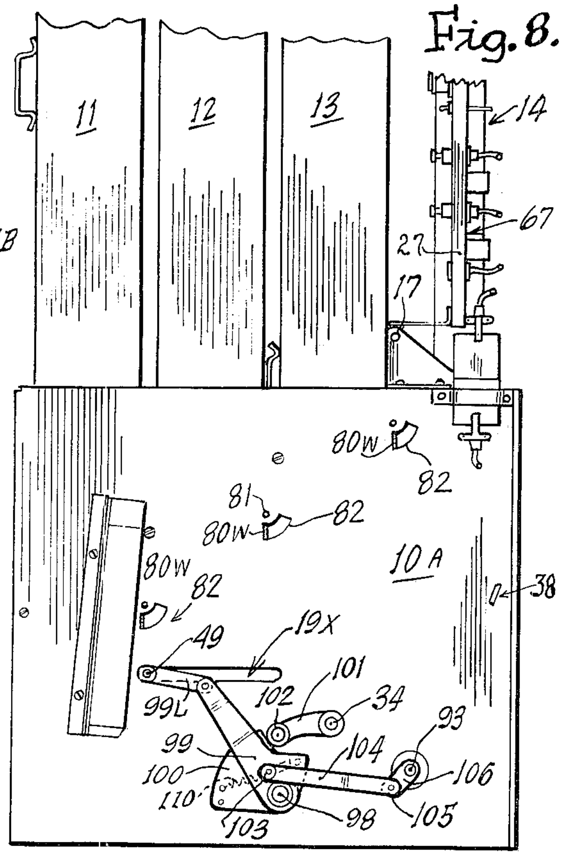
Fig. 7. Fig. 8-A.
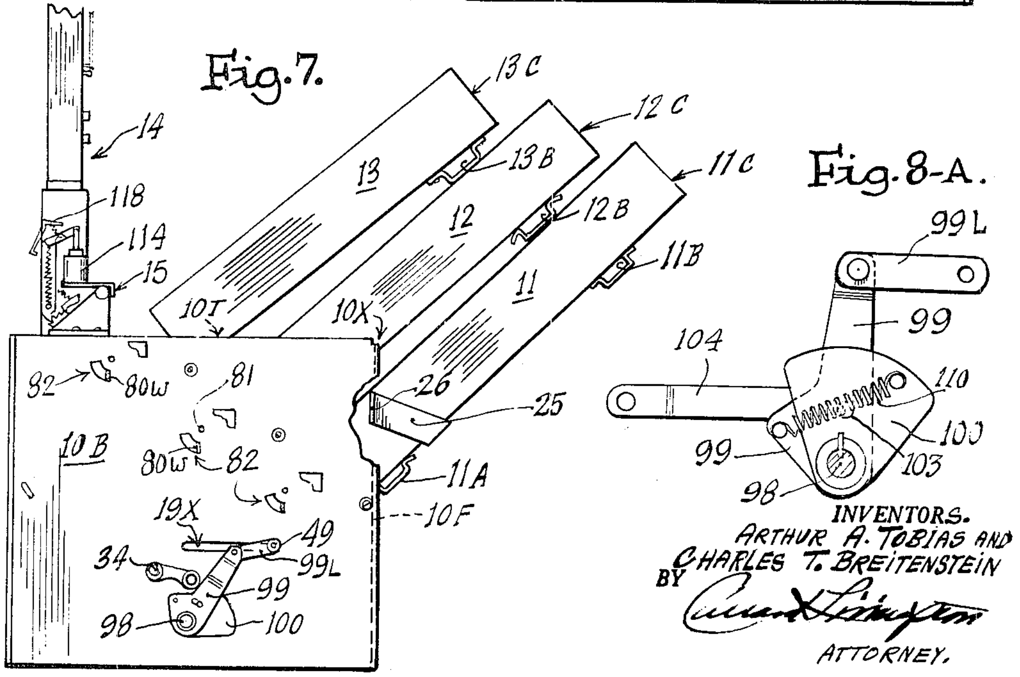
INVENTORS.
ARTHUR A. TOBIAS AND
CHARLES T. BREITENSTEIN
BY [signature]
ATTORNEY.

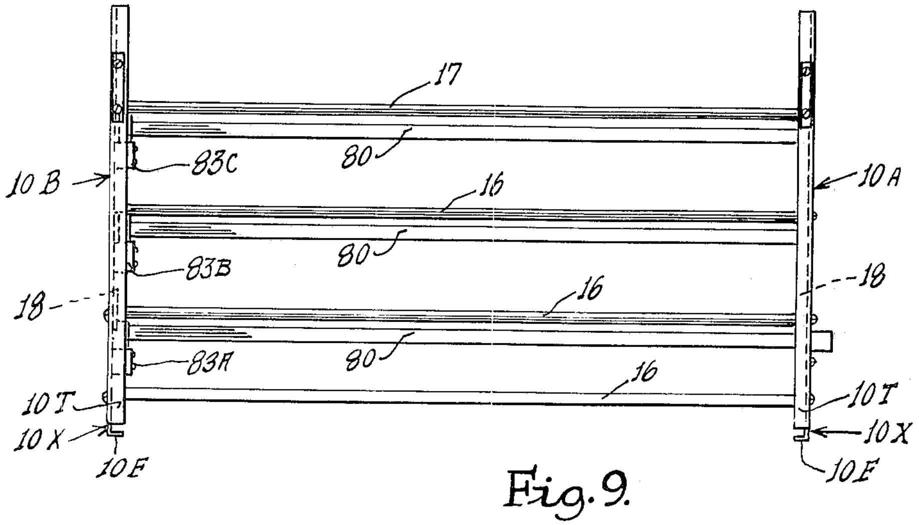
Fig. 9.
Fig. 11.
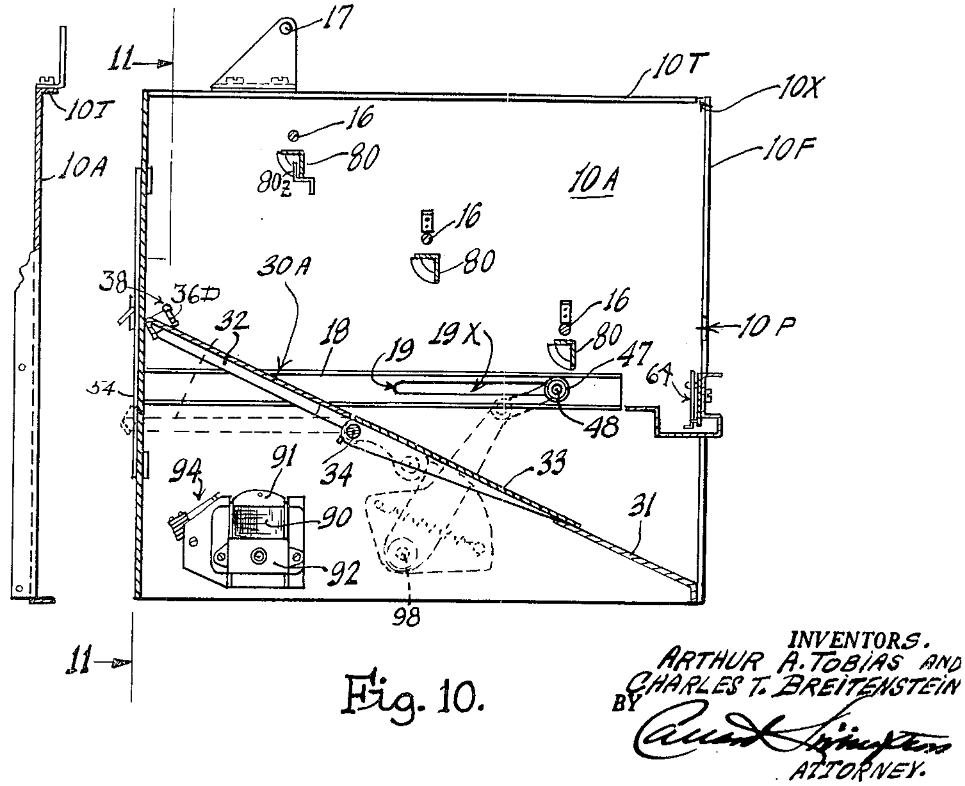
Fig. 10.
INVENTORS.
ARTHUR A. TOBIAS AND
CHARLES T. BREITENSTEIN
BY
ATTORNEY.

INVENTORS.
ARTHUR A. TOBIAS AND
CHARLES T. BREITENSTEIN
BY [signature]
ATTORNEY.

PACKET DISPENSING MECHANISM
Filed Nov. 24, 1961
10 Sheets-Sheet 7
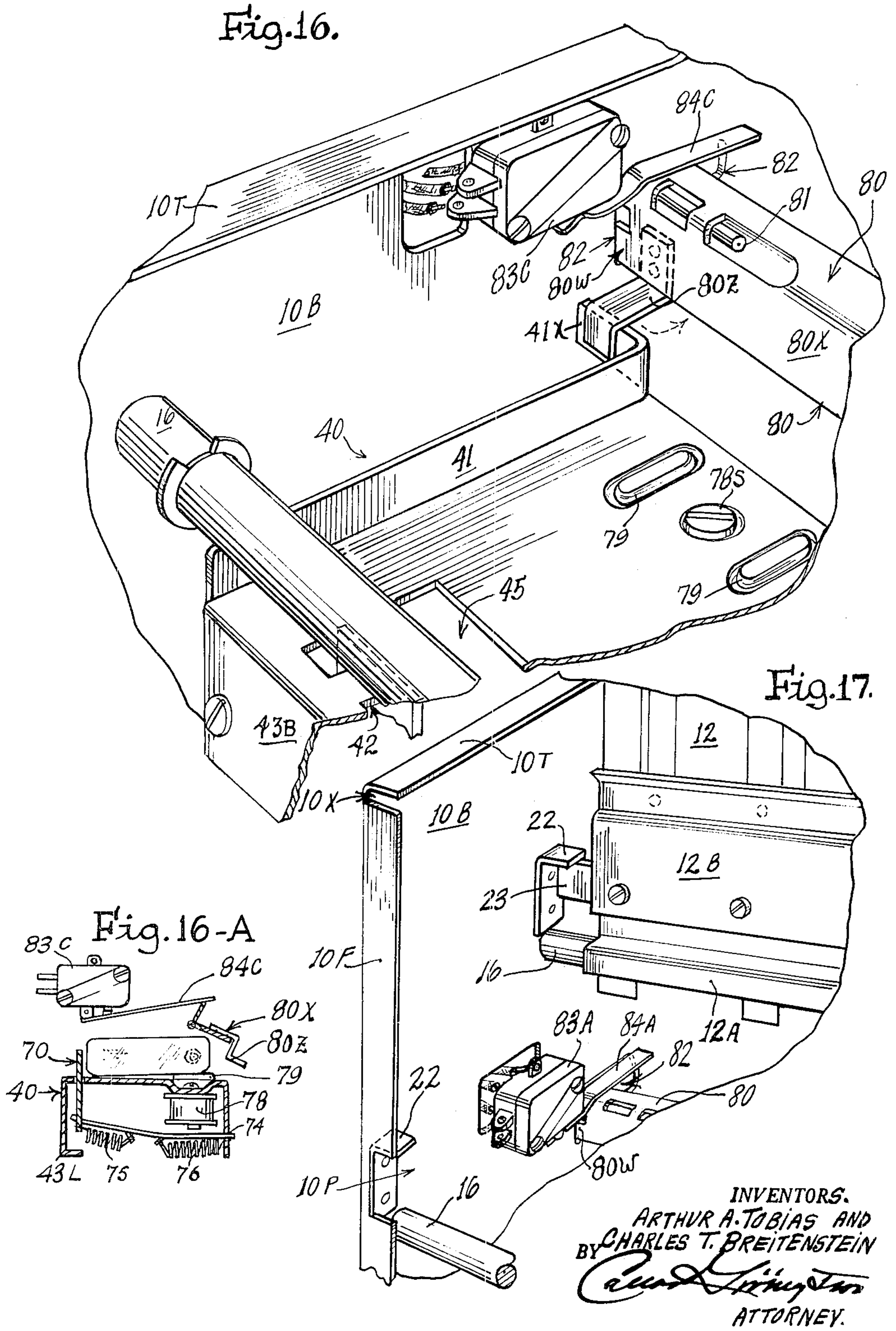
Fig. 16. Fig. 16-A. Fig. 17.
INVENTORS.
ARTHUR A. TOBIAS AND
BY CHARLES T. BREITENSTEIN
ATTORNEY.

INVENTORS.
ARTHUR A. TOBIAS AND
CHARLES T. BREITENSTEIN
BY [signature]
ATTORNEY.

INVENTORS.
ARTHUR A. TOBIAS AND
CHARLES T. BREITENSTEIN
BY
ATTORNEY.

INVENTORS
Arthur A. Tobias and
Charles T. Breitenstein
BY
Attorney 3,228,553

PACKET DISPENSING MECHANISM

Charles T. Breitenstein, Chicago, and Arthur A. Tobias, Morton Grove, Ill., assignors, by mesne assignments, to Rock-Ola Manufacturing Corporation, Chicago, Ill., a corporation of Delaware Filed Nov. 24, 1961, Ser. No. 154,406
32 Claims. (Cl. 221—6)

The present invention has as its principal object the provision of improvements in dispensing and vending mechanisms and provides a multiple-magazine, multi-selection type of machine for vending packaged items (for example, cigarettes) and having an exceptional storage and selective capacity with a high-speed delivery cycle all made possible by unique structural and functional features including a novel magazine structure for expanding the capacity and selective range of this class of dispenser for coin-operated service by means of a stepped level battery of individually-tilting and removable magazine units cooperable with a unitary, stepped-level dispensing carriage reciprocable there-below in short and quick reciprocatory excursions each normally effective to cause a packet of the selected brand of goods to be delivered by ejection from the bottom of any selected column in any magazine at any step level.

Other features of novelty relate to the provision of a method and means for rockably mounting a plurality of multi-column magazine units as well as certain auxiliary control components and subassemblies within a cabinet in a manner such that each of the same can be tilted down into positions of ready accessibility to facilitate installation, removal, or examination for purposes of inspection, loading, or servicing the several magazines and various control subassemblies.

Still other features relate to the provisions of a simplified drive means and control circuit for selectively actuating individual ejection means on the several carriage levels and reciprocating the carriage and concurrently oscillating a cooperative protective shield means guarding certain vulnerable parts of the control mechanism against fraudulent probing operations.

Additional objects and aspects of novelty and utility relate to details of the simplified package-ejecting units and the manner in which they are economically and efficiently contrived as parts of the ejector carriage, together with the means for extending temporary operating circuits to each such ejecting unit, along with other advantageous features of construction and operation of the illustrative embodiment, all of which will appear more fully as the following description proceeds in view of the annexed drawings in which:

FIG. 1 is a front elevational view of the machine as adapted to the vending of cigarettes;

FIG. 2 is a rear elevation of the same to reduced scale;

Figures 3, 3A:
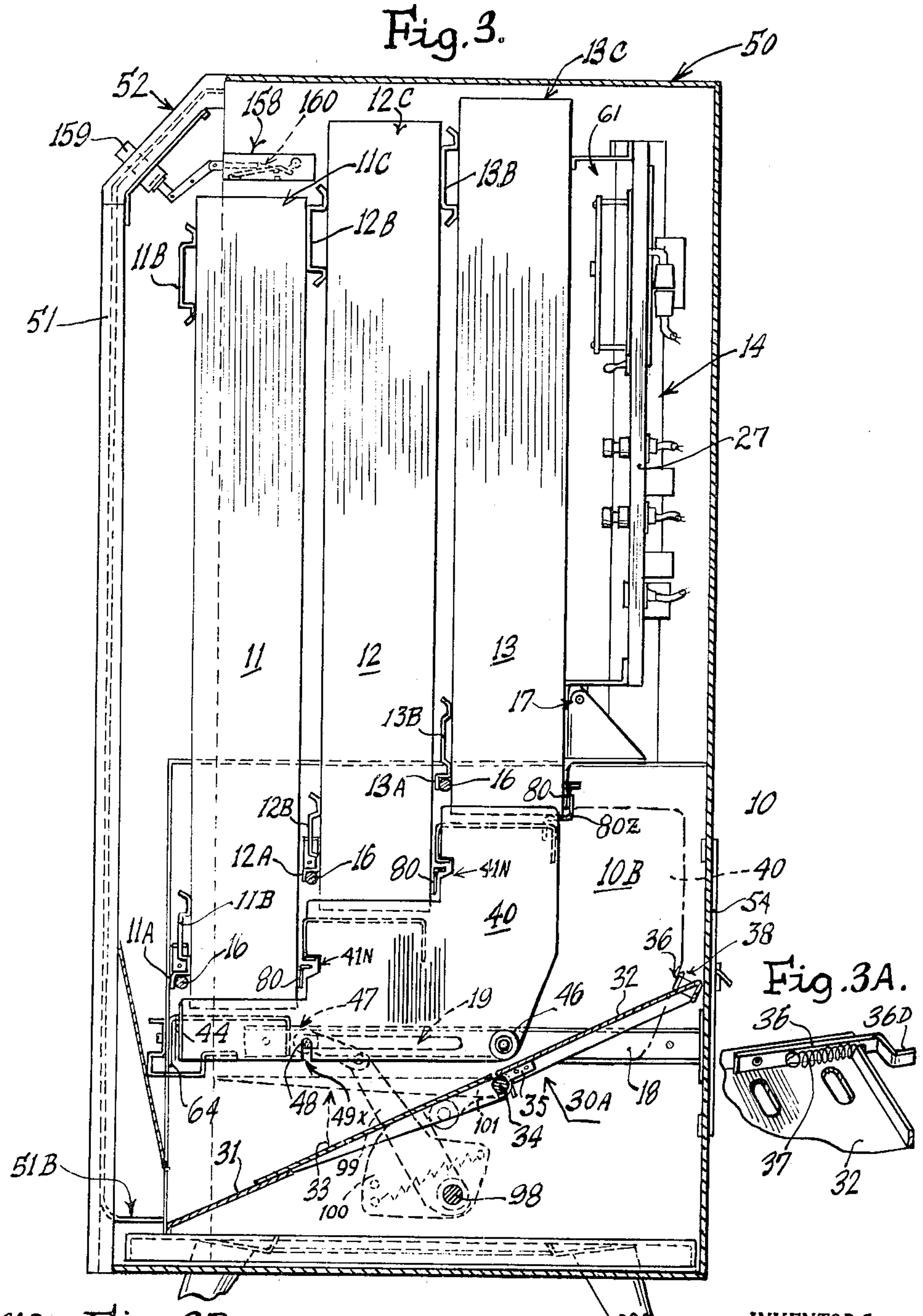
Figure 4:
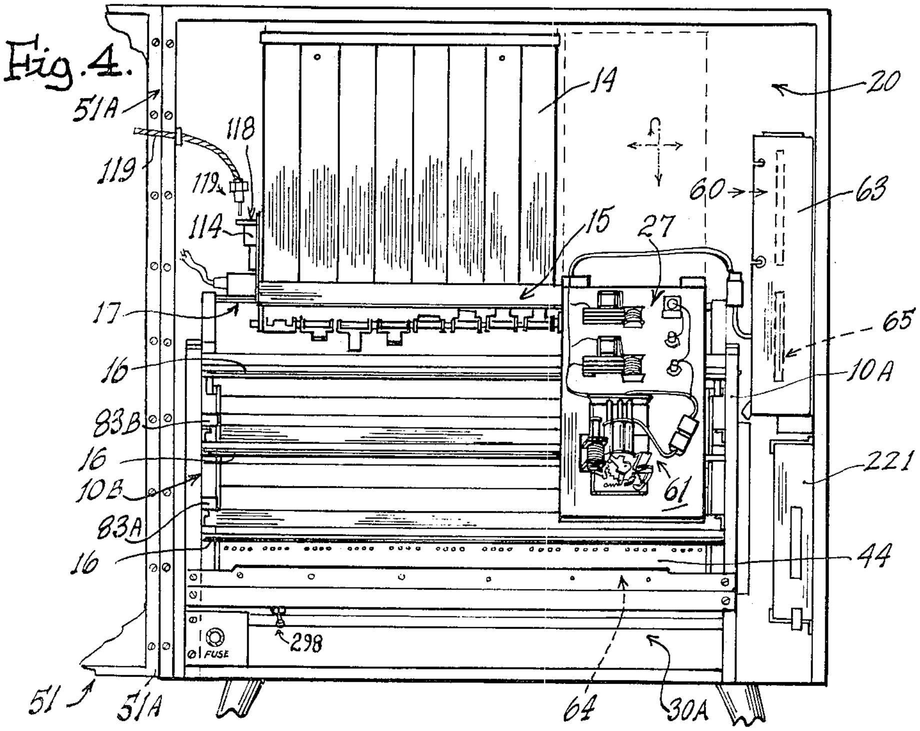
Figure 5:
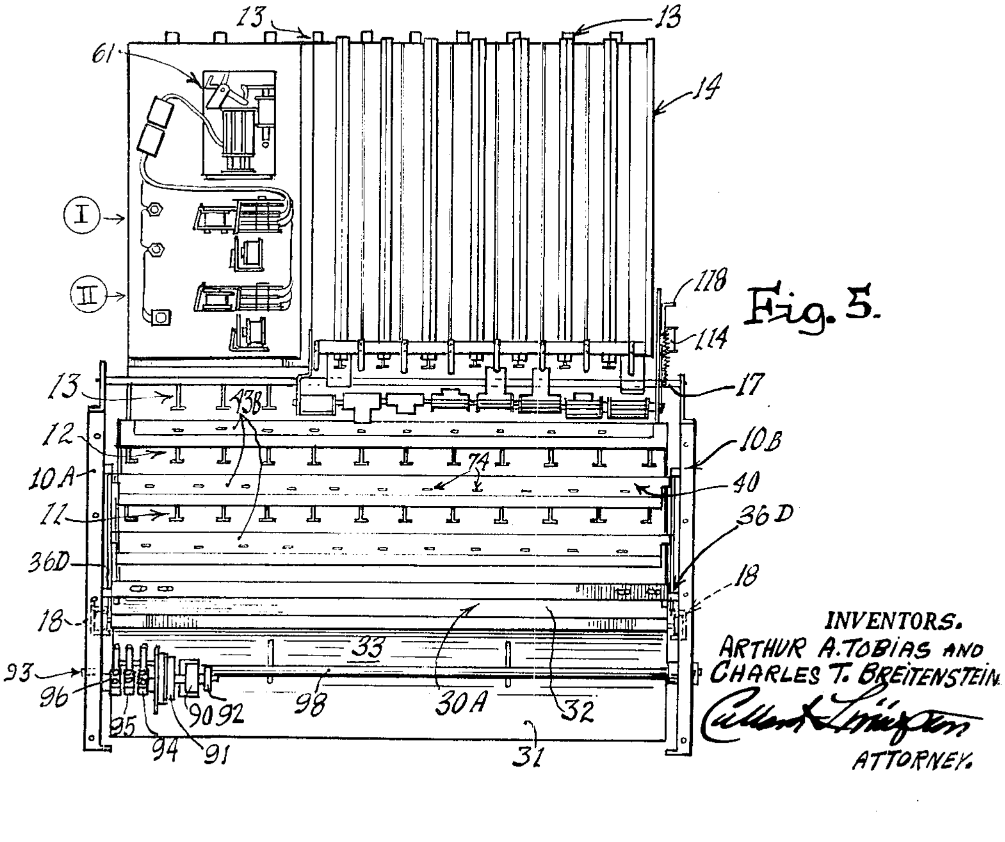
Figures 12, 13, 14:
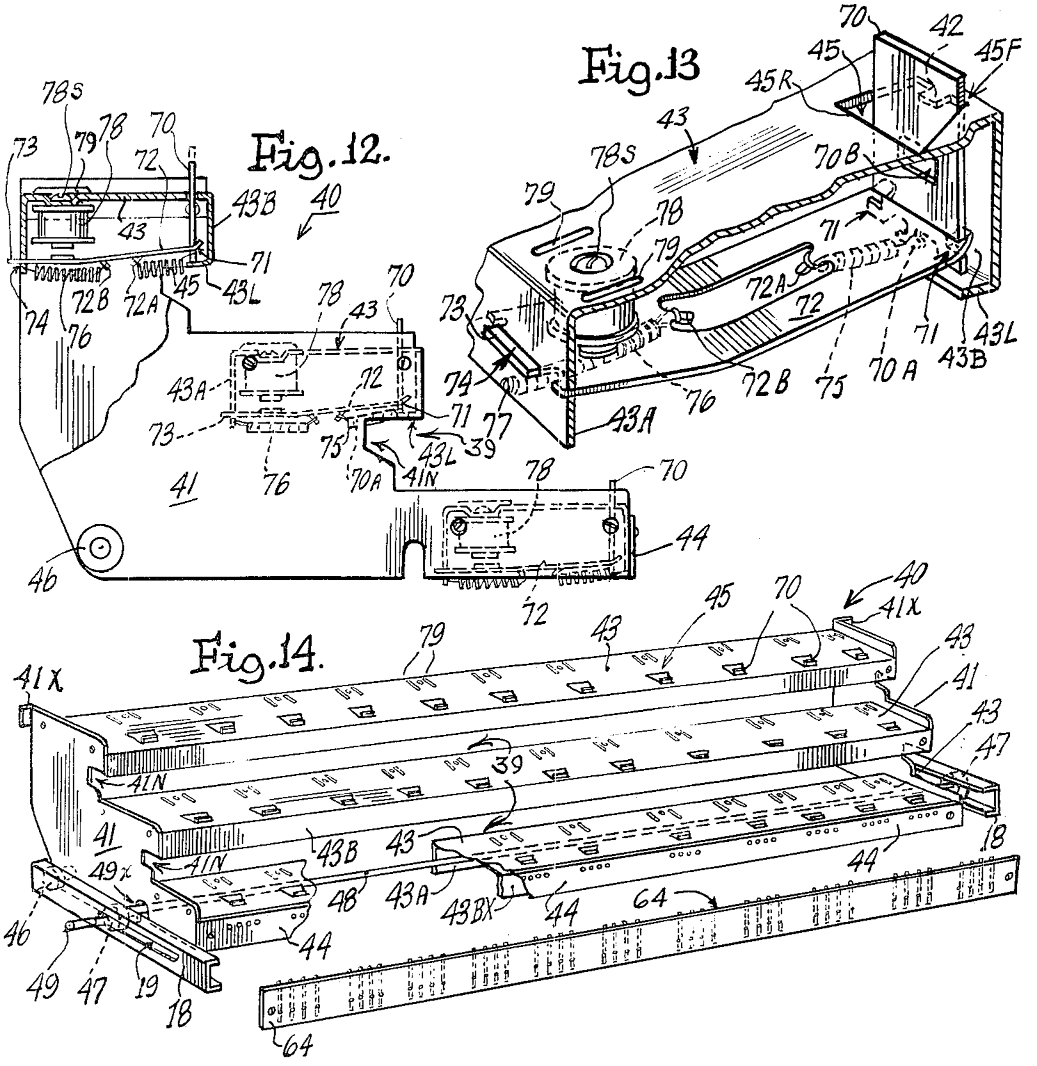
Figure 15:
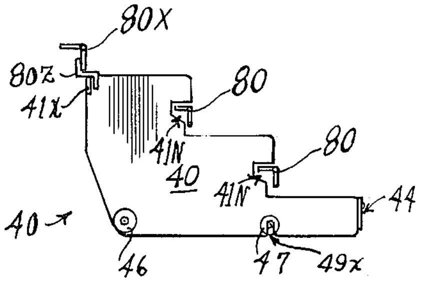
Figure 19:
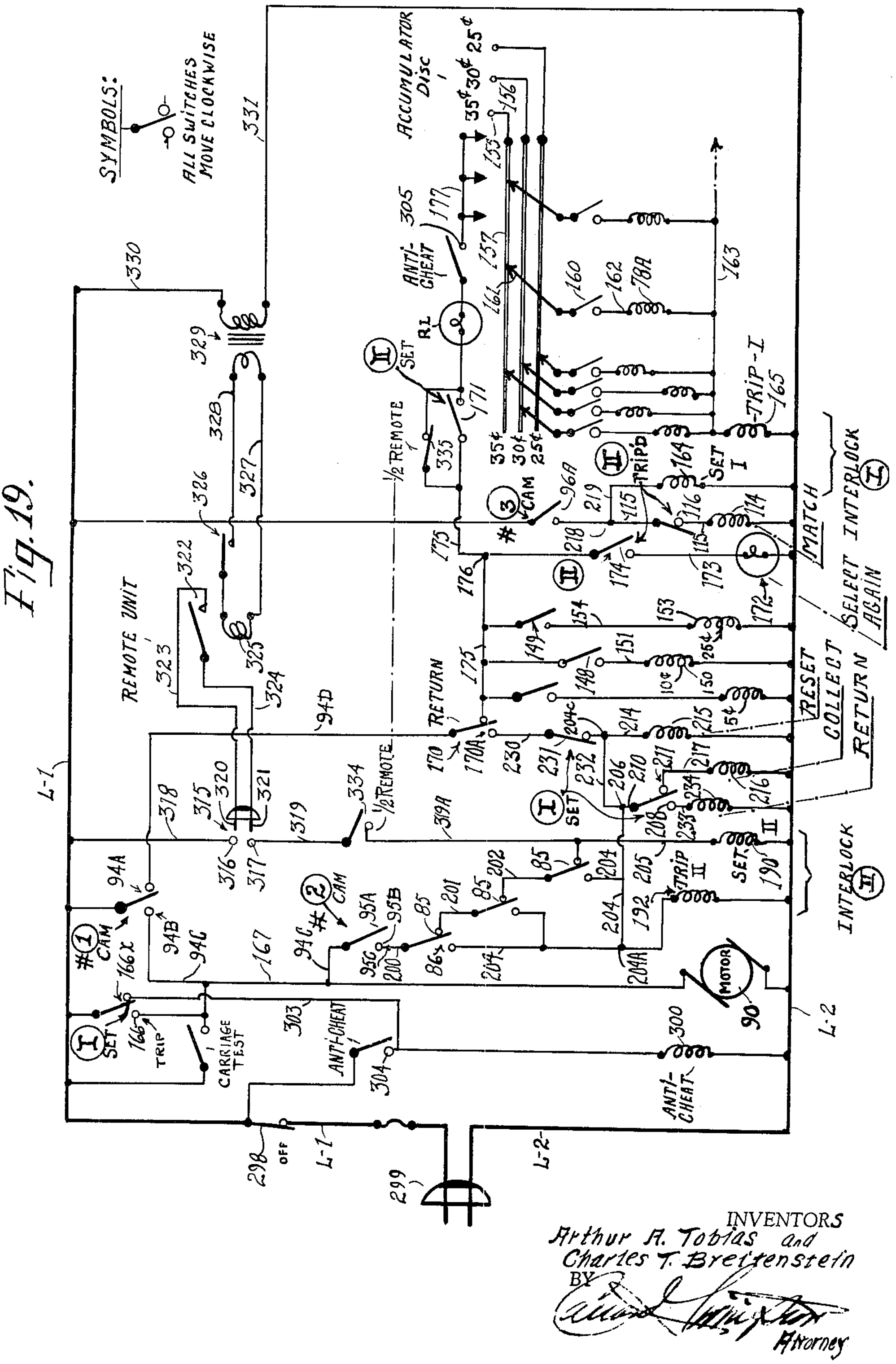

FIG. 2–A is a fragmentary section of the rear access door with parts shown in elevation;

FIG. 3 is a vertical section through the machine of FIG. 1 taken to enlarged scale and having magazine and carriage parts shown in elevation;

FIG. 3–A is an enlarged perspective fragment detailing one of the delivery apron drop latches;

FIG. 3–B is an enlarged side view of the drop section of the delivery apron including latch parts shown in FIG. 3–A;

FIG. 4 is a front elevational view of the machine of FIG. 1 with the cabinet door and goods magazines removed, and the remaining components of the dispensing mechanism seen in elevation, one subassembly panel being tilted down from its normally upright position;

FIG. 5 is a rear elevational view of parts of the mechanism seen in FIG. 4 and removed from the cabinet;

FIG. 6 is an endwise view to reduced scale of the chassis and magazine assembly as seen from the non-driving side;

FIG. 7 is a view similar to that of FIG. 6 but showing the goods magazines tilted down into loading position;

FIG. 8 is a partial view of the driving end of the chassis and magazine assembly which is opposite from that seen in FIGS. 6 and 7;

FIG. 8–A is a detail of the reverse side of the drive linkage seen in FIG. 8;

FIG. 9 is a top plan view of the chassis including the gates;

FIG. 10 is a vertical sectional detail through the chassis including the delivery apron and guard trap with parts on the inside face of one of the chassis' end plates seen in elevation and including one of the carriage tracks and the motor unit;

FIG. 11 is a sectional detail taken along lines 11—11 of FIG. 10 showing a flange form on one of the chassis end plates;

FIG. 12 is an end view, partly in section, of the ejector carriage;

FIG. 13 is a perspective fragment showing one of the ejector units to magnified scale;

FIG. 14 is a perspective view of the ejector carriage and stationary contact panel cooperable therewith;

FIG. 15 is an illustrative endwise view of the carriage and gates depicting the blocking function of the carriage in home position relative to the gates;

FIG. 16 is a magnified perspective fragment depicting the home position interlock of the upper gate by the carriage;

FIG. 16–A is a reduced vertical sectional detail of certain of the elements shown in FIG. 16, illustrating the rocking of the gate by a package during the outbound phase of carriage travel;

FIG. 17 is another magnified perspective fragment detailing one of the magazine safety locks;

FIGS. 18–A and 18–B are complementary sheets to be read together and presenting a pictorial operational and circuit diagram;

FIG. 19 is a wiring diagram including further control features.

The illustrative embodiment of the machine is adapted to coin-controlled operation for vending cigarettes, and the major dispensing components, in their broader aspects, comprise a stepped, tri-level ejecting carriage or truck 40 shown in perspective in FIG. 14, and mounted as in FIG. 3 to reciprocate beneath the correspondingly stepped bottoms of at least three article-stacking magazines 11, 12, and 13, the carriage having selectively-rising ejector fingers 70 (FIGS. 12, 13, and 14) disposed serially across each step level or deck thereof and respectively effective, when pre-set in elevated condition, to engage and push out the lowermost article in an appertaining column of the magazine at the corresponding level, responsive to a reciprocatory excursion of the carriage under control of certain selecting circuits and drive means operated cyclically thereby, following deposit of acceptable coins and the operation of a selector button corresponding to the particular brand of cigarette or other packaged goods desired.

The three principal merchandise magazines 11, 12, and 13 each include a plurality of upright stacking compartments extending in series across the corresponding carriage level, and each adapted to retain a substantial vertically-stacked supply of any of numerous brands of cigarette. In addition, a smaller combination auxiliary magazine and dispenser unit 14 is provided to dispense packets of safety matches either automatically or optionally.

All of these magazines are rockably mounted on rods 16 constituting cross-bearers as well as tie rods between the end plates of chassis 10 (FIGS. 3, 6, and 9) which plates are provided with tracks for the carriage rollers.

Located beneath the tie rods 16 is a combination discharge apron and guard structure adapted to guide the ejected articles from the several overhead magazines into a common delivery tray in the front door of the cabinet, the several magazines being shown in their normal, upright positions in FIG. 6, and in their tilted access positions in FIG. 7, while FIG. 3 shows the magazines in normal operating position within the cabinet 50 together with the carriage 40 disposed in its normal homing position therebelow, is being noted, however, that FIG. 3 presents the opposite end of the chassis from that seen in FIGS. 6 and 7.

More particularly, as viewed in FIGS. 4, 5 and 9, the chassis comprises two end plates 10A and 10B joined by tie rods 16 which are arranged in an ascending stepped relationship (FIG. 10) corresponding to the step levels of the bottoms of the several magazines, which respectively complement the stepped levels of the carriage, as in FIG. 3.

Affixed to the inside face of each chassis end plate is one of a pair of horizontally-aligned channel tracks 18 in which the carriage rollers 46, 47 travels, and at a level below these tracks to underlie all magazines, lies a downwardly-sloping fraud-preventive discharge apron and guard structure generally indicated at 30A (FIGS. 3, 5, and 10) and consisting of a stationary lower delivery section 31 terminating opposite the delivery opening or tray 51B provided in the door 51 of the cabinet (FIG. 1), an upper drop-section 32, and an intervening pivoted guard section 33 carried on a rockable cross shaft 34 journalled in the chassis end plates, this guard section being adapted to swing from a normally lowered condition of alignment with the remaining two sections, as shown in FIG. 3, upwardly out of alignment to the raised guarding position, shown in dotted lines in the same view, so as to lie close up beneath the bottom portions of the carriage at a time when the latter is shifted into the dotted-line dispensing position, toward the right in FIG. 3, for the purpose of blocking entry of probing wires and the like in attempts at fraudulently actuating the gate switches and other control means to be described.

Movement of the pivoted guard section 33 of the delivery chute or apron to blocking or shielding position and back again to lowered delivery position, is coordinated, in a manner to be described, with the ejecting excursions of the carriage 40 by means of a simple driving linkage consisting (FIGS. 5, 8, 8–A) of a rocker arm 101 fast on the guard shaft 34 and having a roller 102 adapted to ride a cam 100, floating on a long main countershaft 98 as a companion apart of the carriage drive and cam lever 99, and adapted to be displaced by means of a reciprocatory motor link 104 connecting at one end with a drive pin 103 on cam 100, and at its opposite end 105 to the motor crank 106, the driving and timing operations of which will be described more particularly hereafter.

Figure 3B:
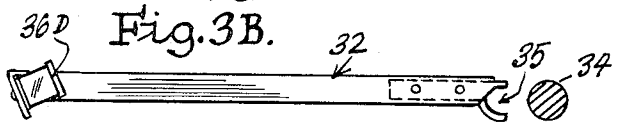

The upper drop section 32 is provided with hooks or yoke hinger 35 (FIG. 3B) pivotally energizing the guard shaft 34 (FIGS. 3, 10) enabling the same to pivot downwardly to the dotted-line position of FIG. 10 on release of laterally-sliding, latch bars 36 (FIG. 3A) urged outwardly by springs 37 to project offset detent ends 36D into slots 38 in the chassis end plates (FIGS. 3, 5, 8) dropping this upper section of the apron to permit removal of the carriage when the chassis is removed from the cabinet.

Referring to FIG. 3, each of the principal magazine sections 11, 12, and 13 has supporting pivot feet or cleats 11A, 12A, or 13A near its bottom, as well as upper and lower combination tie bar and spacer cleats 11B, 12B, or 13B extending horizontally across all of the stacking columns and welded thereto adjacent their respective upper and lower extremities, the pivot cleats being of open claw-like character and each respectively adapted to seat rockably down upon a corresponding tie rod 16 at the appropriate level, so that the magazines each can be rocked down in succession, beginning with the outermost one, 11, from the normally upright position of FIG. 3 (in which the inner two magazines are seen to be spaced from each other and from the first magazine by their cleats 12B, 13B) down to the tilted loading position seen in FIG. 7.

The cabinet and its full-opening front-wall door are preferably dimensioned in relation to the size and tilting axes of the three primary or article-storage magazines 11, 12, and 13, so that in the tilted loading condition thereof their respective upper opening loading ends 11C, 12C, and 13C, will project outwardly of the cabinet at an inclination convenient for dropping replacement packets into any depleted columns.

One of the pivot cleats 12A is shown to enlarged scale in FIG. 17, along with means for blocking direct upward unseating movement of these magazines from their rod seats, such means comprising the provision of an angle abutment member 22 secured on the inner side of each chassis end plate just above the ends of the first two tie rods 16 in ascending order, the top flange 10T of each chassis end plate serving a like purpose for the uppermost magazine, so that no abutment member 22 is needed at this level.

At the bottom ends of each magazine unit are affixed short lock projections or bars 23 extending parallel to the tie rod so as to project beneath the overlying abutment angle and prevent upward unseating of these magazines.

This means is useful in avoiding accidental dislodgement of a magazine unit in shipment, or by careless tilting when it is not the intention to remove the magazine, it being noted however that the magazines can be tilted to a position (e.g., approaching that of FIG. 7) in which the lock projectors 23 will clear the abutment members and permit complete withdrawal of the magazines if desired. A clearance passage 10P (FIG. 17) is provided in the front chassis flanges to pass the stop projections 23.

Another feature ( FIG. 7) is the provision of an angular tilt-stop bracket 25 welded to both sides of the first or lower magazine unit and adapted to drop into a passage 10X (FIGS. 9, 10, 17 also) formed by leaving a clearance beetween the top flanges 10T and adjoining front flanges 10F. By dropping the offsets 26 of the tilt brackets down through chassis entrance slots 10X in inserting the last, front magazine, the offsets 26 will lie respectively behind the flanges 10F and maintain the front magazine in full tilt (FIG. 7), and this magazine in turn will support the others in like loading positions.

The magazine of the auxiliary match-pack unit 14 is smaller than the goods magazines, but is is similarly tiltable (FIG. 4) and removably mounted on a foot cleat 15 engaging its own cross rod 17 extended across the top of the chassis; and while the auxiliary match-serving unit 14 constitutes a complete and novel dispensing apparatus in itself, the match-dispensing mechanism thereof does not per se form a part of the presently-claimed invention, but is the subject of a separate disclosure and claims.

The large front wall opening of the cabinet 50 is provided with a deeply recessed panel door 51 hinged at 51A along one vertical margin of the cabinet to swing fully open for insertion or removal of the several magazines, the chassis, and other components, or for reloading when the magazines are tilted into the loading position of FIG. 3.

Along the upper margin of the door on a sloping panel section 52 is a series of brand selector buttons 159 (FIG. 1) each adapted to be pushed to effect momentary closure of one of the corresponding selector switches 160 (FIG.

3) disposed on a long pricing bus bar and switch strip 158 mounted to extend across the upper door panel behind the selector buttons, whereby to initiate a vending or dispensing cycle and effect delivery of one pack of cigarettes from any one of as many as 33 possible brand selections stacked in appertaining columnar compartments distributed throughout the several merchandise magazines, said selector switches being connected in a control circuit, rendered operable upon the deposit of the necessary coins received in a conventional coin testing device 60, a known type of associated escrow unit 61, combined as a subassembly unit 63 (FIG. 4), all in a manner to be more particularly described hereafter.

In each normal dispensing cycle, the reciprocable carriage means 40 will move rapidly from its home position at the front of the chassis, in alignment close up beneath the magazines, to the dotted-line discharge position shown in FIG. 3 and at once reverse and return to home position; and in so-doing will pick off a pack of the selected brand of cigarettes from the bottom of the selected magazine column by means of a selectively-elevated ejector finger during the outward bound phase of its travel and cause the pack to be discharged therefrom onto the delivery apron on its return trip, in cooperation with certain gate means.

As viewed in FIGS. 12 and 14, the multi-level carriage 40 comprises a pair of end plates 41 stamped in a tri-stepped configuration and having secured thereto across each step level a horizontal step plate 43 having the channel-shaped cross-sectional configuration seen in FIG. 13, so as to include a main horizontal top surface with depending front and rear skirts or walls 43A, 43B.

The selective equipment provided at all the carriage levels is identical with the exception that an insulated contact strip 44 is carried across the outside face of the front skirt 43BX of the lowermost step, for cooperation with a complementary set 64 of stationary contact fingers by means of which temporary selecting circuits are ultimately extended to any of the individual selector units only at times when the carriage is in home position.

As seen in FIG. 12, each of the end plates of the carriage assembly has affixed thereto a roller means 46 in the preferred form of a roller bearing, permanently attached thereto adjacent its rearward bottom corner and respectively adapted, as in FIGS. 3 and 14, to ride in an appertaining one of the two chassis channel tracks 18 in conjunction with a special set of removable front rollers consisting of a similar pair of roller bearings 47, each fixed near one of the opposite ends of a floating axle 48 (FIGS. 3, 11, 14) spanning the entire distance across the underside of the carriage between and through the channel tracks, so that short extended end portions 49 thereof (FIGS. 6, 8, and 14) project through horizontally-elongated slots 19 in each channel track and therebeyond through contiguous registering slot portions 19X punched in the chassis end wall plates (FIGS. 6, 7, and 8) for connection at the outer sides of the said plates with certain driving rocker levers, as will more fully appear hereafter. The aforesaid projecting end portions 49 of the floating axle abut the opposite terminal ends of the long slots 19, 19X to limit the reciprocatory travel of the axle and hence of the carriage, and they seat in vertically open-ended slots 49X in the carriage end plates (FIG. 12).

The aforesaid floating axle means, together with the drop-section feature of the apron, make possible the insertion and removal of the carriage in a minimized clearance space afforded by lowering of the drop section 32 on release of the sliding apron latches 36. Thus, by lowering this upermost part of the apron and pulling the rearward part of the carriage out of the chassis to the limit permitted by the axle slots 19, 19X, the back part of the carriage can be lowered while the front is elevated sufficiently to disengage the open-ended axle slots 49X from the axle itself, following which the carriage can then be readily pulled out the remaining distance to separate it entirely from the chassis, the floating axle, however, remaining captive in the tracks. Conversely, the insertion of the carriage involves no more than a reversal of the foregoing removal manipulations.

The selective ejecting means includes the several ejecting fingers 70 heretofore alluded to, each such finger being part of an independent selecting unit of which there are eleven spaced evenly across each carriage level in the commercial embodiment described, these units being identical and having the simple construction depicted to enlarged scale in FIG. 13.

Each ejector finger 70 is a narrow vertical plate rockably seated, by interfitting lug and slot formations 71, on the end of an armature plate 72 having a fulcrum in the form of a tail 73 projecting through a corresponding one of a plurality of fulcrum slots 74 punched in the rear skirt walls (e.g., 43A) of the several carriage step plates, each selector finger projecting upwardly through a corresponding tapered guide slot 45 in its horizontal step plate surface, these finger slots tapering forwardly from a wider rearward clearance margin 45R down to an easy guiding clearance with the opposite side edges of the corresponding selector plate or finger at the front slot margins 45F.

In each selector unit a spring means 75 is anchored at one of its ends on a tang 72A on the armature plate, and at its opposite end to a tang 70A on the corresponding selector finger, as a result of which the finger is biased in a forward direction toward the front margins 45F of its step slot, the finger nevertheless being rockable rearwardly for release purposes into the wider portion of said slot, as will appear.

The several armature plates 72 are each biased into a normally-lowered position by means of a second spring 76 anchored on a second tang 72B on the armature and a third tang 77 on the rear plate skirt 43B.

Downward bas of the several armatures is limited by engagement with a stop means comprising an inturned stop ledge 43L formed along the lower margin of the front walls of each step plate to underlie the heels of all selector plates, as in FIGS. 12 and 13, whereby all of the armatures and their respective ejector fingers are uniformly located in a predetermined normal retracted position.

Thus, across each step level of the described carriage there will be a transverse series of eleven of these selector units each having its own selector finger aligned at a selecting station with a corresponding one of the overhead columns in the magazine associated with that particular level, each of said selector fingers being aligned to rise into position behind the trailing edge of the lowermost package of cigarettes in the appertaining magazine column, by reason of which any such selector finger raised by energization of a corresponding electromagnetic selector coil into such ejecting position, will impinge against the end of such package to push it out from beneath the stack in the magazine column as the carriage departs from home position.

Each selector unit includes electro-mechanical means for moving and holding its selector finger in the aforesaid elevated ejecting position, such means comprising an electromagnet 78 (FIGS. 12 and 13) secured by screw means 78S in the step plates at each station to overlie a corresponding selector armature 72.

In the face of each selector finger plate is a locking slot 70B (FIG. 13) adapted, as a result of the bias of its spring 75, to be snapped into engagement with a corresponding locking tab 42 on the narrower finger slot margin 45F, so that each ejector finger will automatically lock itself in elevated ejecting condition whenever its electromagnet 78 is properly pulsed.

Above the first and second step levels the vertical walls or skirts 43B are cut out to provide ejection exits 39 (FIG. 14) for the packets lying on those levels, the packets on the top level simply launching out into space for ejection when the carriage returns home, as will more fully appear.

Jam-preventing means is provided at each station in the form of a pair of short, parallel, anti-tilt ribs 79 struck up from the step plate to underlies the leading end of the bottommost package in the manner of short tracks so contrived that the front of the outgoing package will drop down upon these ribs in the ejecting operation and the leading edge of the package will thereby be positively elevated to ensure full head-on collision of the pack with a swinging supervisory gate and reset means 80 lying across its path (FIGS. 15, 18A), while the trailing end of the outgoing pack will in effect be at a sufficiently lower level to ensure its clearing all overlying obstacles.

One of the aforesaid gates 80 is provided opposite each step level near the rearward (left-hand) margin thereof, and takes the form of a long angle bar having pivot studs 81 fixed at its opposite ends and pivotally seated in bores in the chassis end plates (FIG. 16), there being arcuate slots 82 in at least one of these plates (FIGS. 6 to 8) into which end portions 80W of the bar project to limit the swing thereof. The upper face of each of these bars lies normally in a horizontal plane, while the other face 80X hangs vertically, owing to the fact that it is wider and heavier, as a result of which there is provided a gravity-actuated bias for the gate which is more reliable than spring action as respects jamming.

Means is provided for locking the gates when the carriage 40 is in home position, as illustrated in FIG. 15, it being observed in FIG. 12 that the carriage end walls above the first and second step levels are provided with cut-outs or reliefs 41N positioned, as in FIG. 15, to overlie the top flanges of the first and second gates, respectively, in a manner preventing pivotal movement thereof so long as the gates remain in these notches or reliefs. The uppermost gate is also locked up, but by means of dog-leg catches 80Z welded to the vertical flange 80X, at both ends thereof, and projecting back to hook behind a small tab or ear 41X (while the carriage is in home position) struck outwardly from the edges of the carriage end plates. This construction is seen also to larger scale in FIG. 16.

The several gate bars 80 are permitted by the arcuate slots 82 to swing only rearwardly away (toward the right in FIGS. 3 or 16) from the outgoing carriage whenever it moves out of home position and an elevated ejector finger pushes a packet in this direction against the gate to swing it up and out of the way; but, after the trailing end of the packet clears the raised gate and the latter swings down back to pendant position, it becomes, owing to the limiting slot, incapable of further displacement in this return direction beyond normal pendant position and the return travel of the carriage will therefore reset any elevated ejector finger because the latter will strike the unyielding gate, with the ultimate result that the finger must yield instead, and will in fact rock back toward the right (FIGS. 12 and 13), thus disengaging its holding slot 70B from the holding tab 42 so that the appertaining armature can fall back and thus retract and reset such ejector finger to normal, lowered position.

Mounted adjacent each gate 80 on the inside of one of the chassis end plates (FIGS. 9, 16, 16–A, 17) are three corresponding supervisory gate switches 83A, 83B, 83C, each having an operating blade 84A, 84B, 84C, bearing flat down upon the top face of the appertaining gate bar in such manner that when the latter is in normal, pendant position, the top face thereof will lie in a horizontal plane and therefore the corresponding switch-actuating blade 84A, 84B, 84C, will rest flat in a normal position thereon (FIG. 16); but when such gate bar is rocked up by passage of an ejected package, as in FIG. 16A, the top of the bar tilts out of its normal plane and moves the corresponding switch actuating blade to operate the switching contacts thereof.

Actuation of any supervisory gate and its switch means, as aforesaid, has as its ultimate purpose ensuring the completion of a full dispensing cycle of the driving and timing means and to effect actual discharge of goods in the case where there is at least one package remaining in a selected magazine column and to protect the patron, should the selected column be empty (or should no package be ejected for some other reason) with a consequent failure to operate the supervisory gate switch, the control circuits of the machine being contrived not to collect the deposited money at once, but to signal and permit the making of another brand selection, or alternatively to permit return of the money at the option of the patron, as will be more fully explained hereinafter.

Means for reciprocating the carriage comprises a small motor drive unit generally indicated at 90 in FIGS. 5 and 10 and mounted on the inside face of one of the chassis end plates, said unit including a suitable reduction gear means 91 which drives a crank 106 located on the outside face of the same end plate (FIG. 8), and made fast on a short driving countershaft 93 on the inner side of this end plate and carrying a set of three timer cams 94, 95, 96, and associated control switches connected in the master control circuit described hereafter. (See FIG. 18B also.)

The drive means further includes a long main countershaft 98 (FIGS. 3, 5, 10) extending beneath the apron structure all of the way across the chassis and through suitable bearings in both end plates thereof, the projecting ends of this countershaft each having affixed thereto at the outer sides of the chassis one of a pair of twin drive rocker levers 99 floating freely on the countershaft 98 (FIGS. 6 and 8) which in turn respectively connect through links 99L with one of the exposed ends 49 of the floating carriage axle, so that oscillation of levers 99 will traverse the carriage back and forth between its home and discharge positions, limited, as aforesaid, by the range of movement of the floating axle ends 49 in track slots 19, 19X.

Figure 18A:
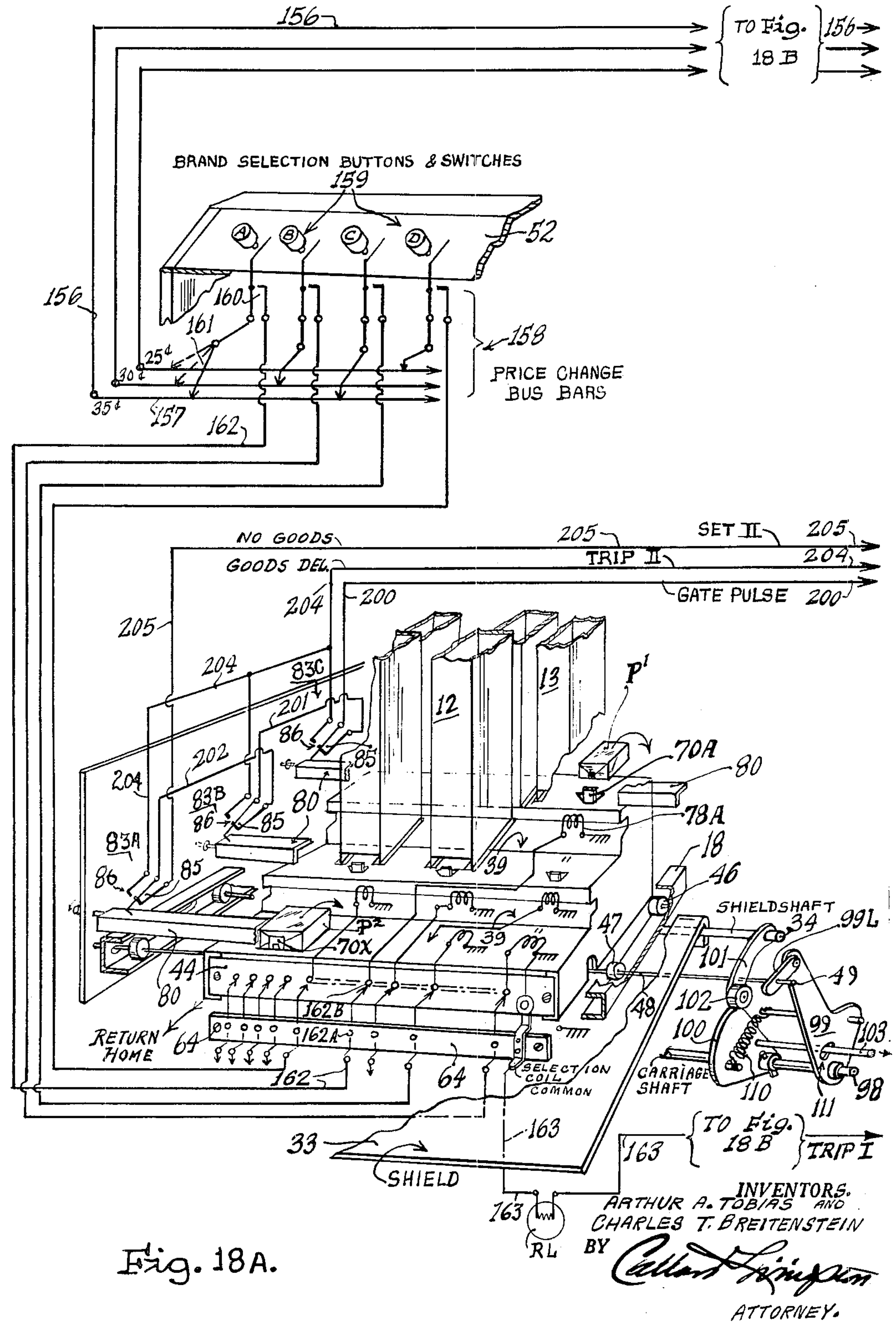

The floating rocker levers 99 are each associated with a companion cam 100 fast on the main countershaft 98 (FIG. 18A) and each connected to its rocker lever 99 by a traction spring 110 anchored to pins (FIG. 8A also) respectively staked into the lever and cam and tending to draw one toward the other to the limit of the coupling pin 103 in an arcuate slot 111 of about 15 degrees length in rocker 99, as seen in FIG. 18–A.

The carriage 40 does not start to move from home position at once when the motor crank 106 and drive cam 100 first start in each vending cycle, owing to the length of the coupling slot 111 in rocker 99, the carriage starting its excursion only when the coupling pin 103 reaches the end of the slot (by movement toward right-rear in FIG. 18A).

In this manner a guard interval of about 15 degrees is provided during which the movable shield or guard section of the apron structure can have time to rise fully beneath the carriage before it leaves home position. This latter movement is effected by displacement of the cam 100 and the rocker arm 101, 102 affixed to the shield shaft 34. The reverse guarding action also occurs as the carriage moves back to home position, namely: the fraud shield will not begin to drop until the carriage is fully home.

In its dispensing excursions, the carriage does not dwell at the outer limit of travel (dotted lines, FIG. 3) for any appreciable time, but reverses very quickly for movement back to home position; and it is in this return phase that an ejected pack of cigarettes lying on the step plate will be dumped onto the apron because of the inability of the restored gate bar to swing back beyond its normally pendant position as the carriage returns beneath it.

While the illustrative embodiment of the machine has been described as a cigarette vendor, any type of goods can be dispensed so long as individual packs or items can be stacked and fed from the magazines by the ejector means 70.

In addition to greatly facilitating loading, the tilting magazines in stepped arrangement result in a greatly increased capacity without corresponding complexity of the selecting and ejecting means or structural arrangements, and a great gain is achieved in respect to the ease to service the mechanisms, apart from loading. Critical components, such as the match dispenser 14 and the control subassembly panel 27 (FIG. 4) carrying the credit accumulator means and the two interlocking relays I and II, can be dropped for examination, as in FIG. 4, or easily removed for repair or replacement.

The carriage 40 and its complement of selecting mechanisms, forming, as they do, a part of the carriage structure, all easily accessible from the bottom of the carriage, can be removed quickly on removal of the chassis through the front door opening, dropping the upper section 32 of the apron, and tilting the carriage to separate it from the floating axle.

In the rear wall 53 of the cabinet (FIG. 2) there is provided a small access and inspection door 54 having a series of sight glasses 55 thereacross at a level giving a view of the bottoms of the magazines, by means of which the revenue stamps can be seen without opening the machine, and by means of which the location of jam-ups due to off-size or crippled packs can be detected.

The access door 54 (FIGS. 2 and 2A) is provided along its upper and lower horizontal margins with a lower channel 56 and an upper channel 56A which is deeper than the lower channel, whereby the door is set home by working the upper channel onto the upper margin of the door opening in the cabinet wall, then dropping the door down onto the lower margin of said opening a distance (owing to the shallower depth of the lower channel) which leaves the door locked into the margins of the door opening at top and bottom. A hand lever 57, reached through the front door as by rocking down the subassembly panel 27 (FIG. 4) will raise the locking lever 57A from a pocket 58 in the door to free the latter for elevation and disengagement of said upper and lower channels from the margins of the access door opening.

*Operation*

The operation of the machine is now described with reference to a pictorial schematic of its basic components shown in conjunction with the circuit and control means depicted in the two complementary views of FIGS. 18A and 18B.

The "normal vending cycle" is considered one in which the patron of the machine receives the brand of cigarettes or other goods selected on the first operation by reason of there being at least one packet of the selected brand present in the magazine, while the "repeat vending cycle" is one in which the selected brand is exhausted and certain repeat or second-selection circuit means affords an opportunity to the patron to make another selection without necessitating recovery and redeposit of the coins first deposited.

By way of example, a normal cycle may be assumed to begin with the closure of some form of master switch, for example a coin credit switch, which in this instance will be actuated by the deposit of a 10-cent and a 25-cent coin with the intention of selecting brand "A" cigarettes for which the price is 35 cents, the coins entering and being tested in a known type of coin testing chute 60 (FIG. 18B) and, if acceptable, respectively momentarily closing the 10-cent and 25-cent switches 148 and 149 with a consequent pulsing of the corresponding 10-cent credit coil 150 via conductor 151, and the 25-cent credit coil 153 via conductor 154, and the ultimate closure thereby of master switch means, which in this instance will be the 35-cent accumulator credit switch 155, all in a manner, and by coin-testing and credit mechanisms 60, 61, 65 which are of known character and commercially available in the art. The accumulator unit 61 and its credit coils 150, 153, etc., are carried on the subassembly panel 27 (FIGS. 4 and 5), while the escrow unit 65 is associated with the coin chute 60 in another unit 63 above the cash box 221 on the cabinet wall.

Figure 18B:
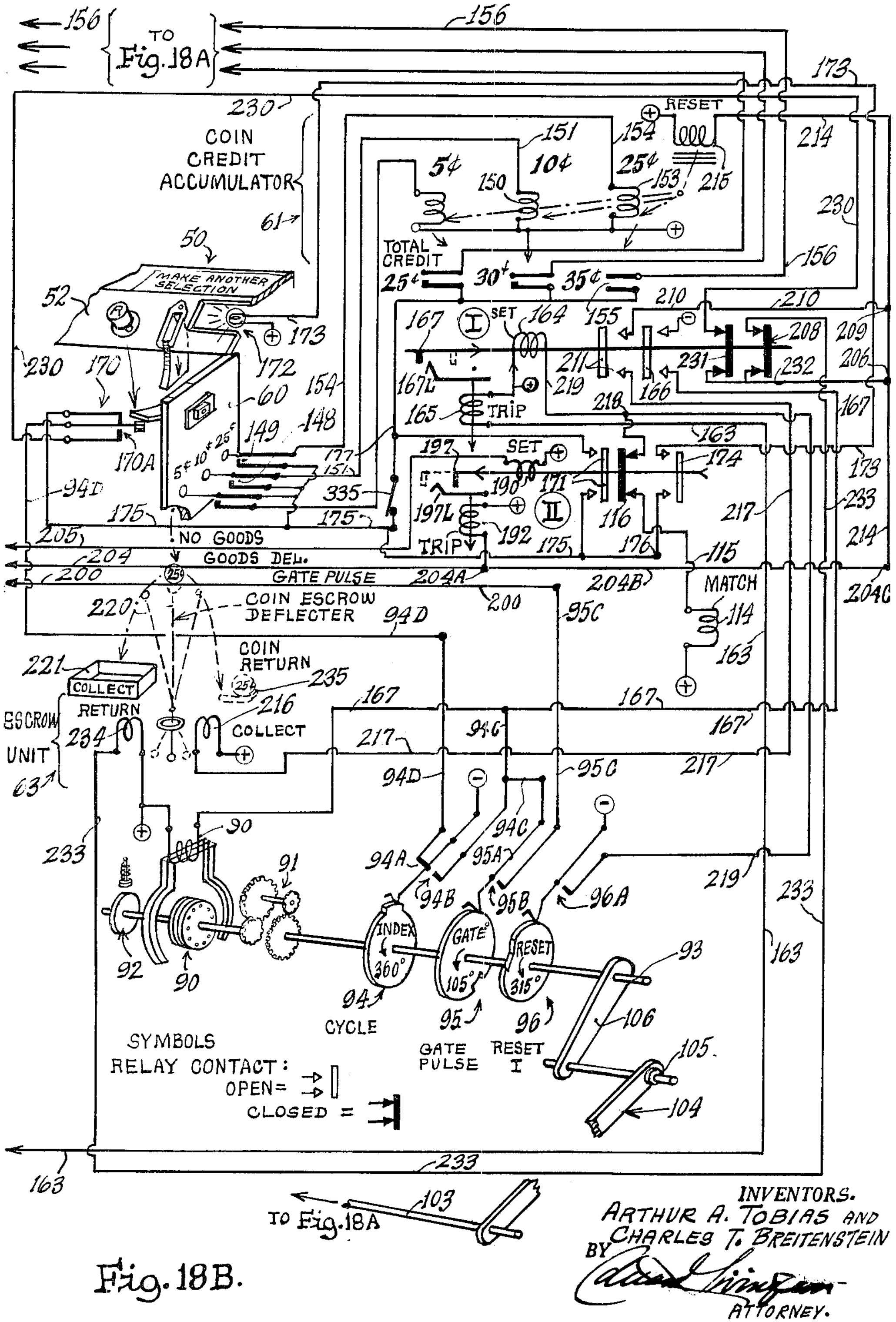

As a result of the aforesaid closure of the 35-cent credit switch 155 (it being understood that the interlock relay I is latched up as shown in FIG. 18B at this time) selection operating power (from conductor 175, via switch 335 normally closed, and conductor 177) is connected via conductor 156, extended into FIG. 18A, to the price change bus bar 157 for the 35-cent selection values in the selector switch and price-change strip unit 158 located (FIG. 3) beneath the selector buttons 159 on the panel 52 at the top of the cabinet door.

The selector switch 160 corresponding to the brand "A" button on panel 52 is shown as having its price-change switch arm 161 set (full lines) on the 35-cent bus bar 157, and on pressing this button (FIG. 18A) the corresponding selector coil 78A on the carriage will be energized via conductor 162 and the appertaining contacts 162A, 162B on the stationary and movable carriage contact panels 44, 64 to cause the ejector finger 70A to be elevated to ejecting position in the manner previously described in detail.

The selection pulse to selector coil 78A resulting from the pushing of button "A," as aforesaid, is completed via a common selector-coil conductor 163 (including a fraud-preventive resistance lamp RL) extending into FIG. 18B, to energize the trip-out coil 165 for the first of two interlock relays, I and II, which are of the known type adapted to be automatically locked up in a *set* condition by pulsing one coil (e.g., 164 or 190) and to be tripped out or unlatched by pulsing a release or trip coil 165 (or 192).

In order to procure maximum sensitivity for the positive trip-out of the first interlock trip coil 165 and thereby discourage fraud perpetrated by pushing two or more selector buttons in rapid succession, the trip coil 165 is made sufficiently marginal so that it will not respond to an operating voltage which is a few volts less than the intended tripping value, and this coil is connected in series with the resistance lamp RL, which may be a 60-watt tungsten filament lamp, the resistance of which, when cold due to no current flow therein, is not high enough to impede the full response of the trip-out coil, but which will increase in resistance immediately on passage of the current necessary to trip this coil and cause a sufficient voltage drop to prevent tripping out additional selector coils immediately thereafter, thereby preventing the delivery of two or more packs for the price of one.

When the first interlock relay I is tripped out as aforesaid on pushing button "A," its contacts 166 (which are open in the latched condition shown) will be closed and apply via 167 starting power to the driving and timing motor 90, which begins to turn the countershaft 93 through the dispensing or vending cycle, which will now be maintained by a cycle over-ride or holding circuit for the motor set up at index cam switch contacts 94B, this circuit being opened at the conclusion of the cycle when cam 94 has turned through 360° of travel marking the end of such cycle.

Index switch contacts at 94A are opened at once for the duration of the cycle to disconnect power from conductor 94D, and thereby disable the several coin switches, the coin-return switch 170, and contacts 174 on interlock relay II controlling the "Make Another Selection" lamp 172.

The vending cycle having been initiated by starting of motor 90, as aforesaid, the dispensing carriage 40 begins its ejecting excursion after a short guard delay of about 15 degrees of the indexing cycle in order to give the guard shield 33 time to rise fully into blocking position therebelow, as previously explained, this delay being achieved through the lost-motion coupling between the rocker lever 99 and cam 100 by coupling pin 103 working in slot 111 (FIG. 18A).

Since an ejector finger 70A now stands elevated as a result of pushing selector button "A" and a supply, or at least one packet, of brand "A" cigarettes is assumed to stand in the appertaining magazine column, the ensuing advance of the carriage will cause a packet $P^1$ to be stripped from beneath the stack and lodged on the corresponding (top) carriage level in a manner illustrated by another packet $P^2$ (necessitated because of space limitations) shown on the first level in FIG. 18A to depict the relative position of an ejected packet to a corresponding gate at the time the carriage approaches the end of its outbound travel, as in FIG. 18A. See also FIG. 16A, which illustrates the ejecting action during the outbound phase of carriage travel as the gate is opened and passed by the ejected packet.

The ejected packet, either $P^1$ or $P^2$, will ultimately be dumped onto the inclined delivery apron structure 30A as a consequence of the reverse travel of the carriage back to home position, this action being the result of impingement of the elevated ejector finger (e.g., 70X) against the pendant gate and the pushing force thus applied to the trailing end of the ejected packet by such reverse carriage travel, which causes the packet to be pushed in the direction of the arrow through the carriage exit opening 39, or (in the case of the $P^1$ pack) directly off the top carriage step, as the result of the fact that the gates are not capable of pivoting reversely past normally pendant condition.

Thus, not only will the ejected packet be expelled from the carriage, but the ejector finger which causes the ejection of the pack from the magazine will also be forced out of engagement with its holding lug 42 (FIG. 13) and thereby caused to drop downwardly back to reset condition, as a function of the return of the carriage to home position.

In addition to coaction with the carriage in expelling the selected packet, as aforesaid, the several gates 80 and associated supervisory switches 83 govern the cycling and possible recycling of the dispensing operation dependently upon whether the selected goods is, or is not, actually dispensed in any first-selection cycle, as will now appear.

In the "normal-cycle" carriage excursion being described, at least one pack of the particular brand of cigarettes selected is presumed to be in supply and to be duly ejected from the magazine onto the carriage; and during the outbound travel of the carriage such ejected pack necessarily moves beneath the appertaining gate and pivots the latter upwardly out of its path in passing (FIG. 16A), thereby causing the operating blade 84 of the corresponding gate switch to open contacts 85 and to close circuit at the "make" contact 86 to set up a checking circuit for signalling the goods-delivered condition to the control circuits via conductors 200 and 204.

The second or "gate-pulse" cam 95 of the trio of timing cams on motor countershaft 93, as seen in FIG. 18B, after turning approximately 105° from starting position in correspondence to a time when the ejected pack should be travelling fully beneath the gate, will close contacts 95A, 95B of the corresponding cam switch and apply power derived from jumper 94C and the motor holding circuit at 94B, via conductor 95C, to provide a delivery-checking pulse to the gate switch conductor 200 extending into FIG. 18A, and via the last-described closed gate switch contacts at 86 to the conductor 204 extending back into FIG. 18B to energize the trip coil 192 of interlock relay II at junction 204A to trip-out the same should it be in set condition; and, in addition, to reset the accumulator via branch conductor 204B to junction 204C with accumulator reset conductor 214 leading to said reset coil 215.

The aforesaid delivery-confirming gate signal is further utilized to collect the money by energization of the escrow collect coil 216 via conductor 217, relay I contacts 211, closed when tripped (now by ejector coil pulse as aforesaid), conductor 210 to another junction 209 with accumulator reset conductor 214.

Thus, the "goods-delivered" gate signal serves to trip out the second interlock relay (should it have been left latched-up, as on a repeat operation) and thereby disable the second-selection or "repeat cycle" circuits controlled thereby, and to reset the coin credit accumulator unit, and to collect the coins from the escrow unit.

As the end of the described "normal" dispensing or vending cycle approaches (at about 315° of control cam displacement) the third and last control cam 96 will effect a terminal resetting operation by closure of cam switch contacts at 96A to energize the setting coil 164 of the first interlock relay I via conductor 219 and its upper branch to this relay, so that the latter again becomes latched up in readiness for the next operation of the machine, it being noted that while this latching-up operation will break the primary motor power circuit at interlock I relay contacts 166 (otherwise closed in the tripped-out condition) the motor will nevertheless continue to run through full cycle owing to the persistence of the holding circuit at contacts 94B.

As a further incident to the aforesaid closure of the third cam switch contacts 96A, the match dispenser 14 will be armed by a pulse to its driving solenoid 114 (FIGS. 6, 7, and 18B) via conductor 115 to now closed relay II contacts 116 and junction 218 with the upper branch of checking pulse conductor 219 to the setting coil of relay I just mentioned.

Such energization of the match dispenser solenoid 114 (FIG. 6) sets the latter in readiness to be manually tripped out by movement of a trigger lever 118 as the result of pushing a special button MP (FIG. 1) on the selector panel, which will transmit a thrust to said dispensing trigger lever 118 through flexible cable and plunger means 119 (FIG. 4) causing release of one packet of matches by action of certain spring-driven ratchet ejecting means (not seen) prepared for triggering by energization of solenoid 114, as aforesaid, further details of such a match dispensing unit being disclosed and claimed in the copending application of Arthur A. Tobias, Serial No. 55,945, now Patent No. 3,095,114, such a mechanism being of general interest herein primarily as illustrative of a subassembly unit tiltably and removably assembled for coaction, loading, and service access in combination with the other instrumentalities described.

It may be observed that the trigger lever 118 may be disabled by shifting certain spring connections (not seeen) according to the disclosures of said application, so that the operation of the match dispenser optionally can be made wholly automatic responsive only to energization of the coil 114 (i.e., by the aforesaid "arming" pulse).

Shortly following the aforesaid resetting of the first interlock relay and operation of the match pack dispenser, the index cam 94 will terminate the cycle by opening the motor holding circuit at index contacts 94B, and coming to rest with contacts 94A reclosed, as in FIG. 18B.

The alternative to the "normal" operating cycle last described is the recycled or second-selection operation set up under control of the gate supervisory and signalling means in the case where the supply of goods in the selected magazine section is exhausted, so that no packet is ejected to actuate the gate means and therefore no "goods delivered" signal can arise. In this situation, the gate supervisory means, in conjunction with the delivery-checking pulse originated by the second control cam 95, sets up a second-selection or repeat-cycle circuit which includes illumination of the "Make Another Selection" lamp 172 on the selector button panel of the machine (FIGS. 1, 18B).

Assuming for the second time that the patron conditions the master switch means for an operation of the machine, as by deposit of the requisite 35 cents in coins, and pushes the brand "A" selector button again, as in the normal operating cycle heretofore described, but that in this example the supply of brand "A" packs is exhausted, the operation of the machine will be exactly as described for the normal cycle up to the point where the delivery-checking signal or test pulse is originated by cam switch means 95 at contacts 95A, 95B (FIG. 18B), and transmitted by conductor 200 extending into FIG. 18A to the gate-switch chain circuit. Since there is no pack on the carriage to open any gate 80, all of the gate switches will remain in normal condition as depicted in FIG. 18A, and the checking pulse will be applied via gate switch link circuit connections 201, 202, to conductor 205 extending into FIG. 18B to energize the setting coil 190 of the second interlock relay II so that the latter becomes latched up at 197, 197L (dotted lines), thus conditioning the second-selection circuits for repeat operation is due course following the termination of the cycle first initiated. It should be remembered that failure of the gate supervisory means to return a goods-delivered signal leaves the first interlock relay I in the tripped or unlatched condition until the end of the cycle, when it is restored by cam switch 96A to the set condition, as it appears in FIG. 18B, but at this juncture (before such restoration) the second interlock relay II is now to be considered still latched-up.

As a result of setting up the second interlock relay II the "Make Another Selection" lamp 172 (FIGS. 1 and 18B) becomes illuminated via conductor 173 and contacts 174 closed in the now latched-up condition of interlock relay II, and connecting with power feed conductors 175 at 176 from the coin return switch 170, normally closed. The credit reset coil 215 and coin collect coil 216 are not energized under these conditions.

In the last-described condition of the repeat-cycle circuits thus set up following conclusion of the aforesaid non-delivery cycle, the patron now has a choice of procuring the return of the money from the escrow unit or of making another selection by simply pushing another selector button without the inconvenience of having to recover the money first, since interlock relay I is by this time reset by cam switch 96A.

If the return button R is pushed to actuate the return switch 170 (FIG. 18B) after the end of the first cycle, power from conductor 94D will be connected at its contacts 170A closed, via conductor 230 through relay I contacts 231 closed, conductor 232 contacts 208 closed, conductor 233 to the escrow coin return coil 234, causing a known type of coin deflector 220 to shift in the direction for dumping the returned coins into the return tray 235 (i.e., at 51B, FIG. 1).

If the patron decides to make another selection, he may, without necessity of actuating the coin return switch 170, now push a different one of the selector buttons, this time selecting brand "B," for example, and the operation of the machine will go forward exactly as before, with the obvious exception that a different selector coil, for instance for ejector 70X (FIG. 18A) will be energized, and it will be assumed that the corresponding magazine section is in supply and that a pack $P^2$ is ejected, from which point the remainder of the vending cycle will be as described for the first operation in which the brand "A" goods selection was delivered.

The important thing is that, as a result of there being goods to deliver, the gate switch can return a goods-delivered signal to lock out the repeat cycle circuits so that no further repeat selections can be made except upon deposite of the requisite coins to initiate a wholly new "normal" cycle. This lockout involves pulsing the relay II trip coil 192 by the gate signal on 204 and 204A, along with a pulsing of the coin accumulator reset coil 215 via 204C, 214 so that the credit switches 155, etc., are opened at once before the reset cam switch means 96, 96A can reset relay I.

Commercial embodiments of the disclosed machine may optionally include additional equipment for fraud prevention, and various auxiliary conveniences, such as a counter for tallying the number of packs dispensed, lighting equipment for illuminating the front face of the cabinet, the selector buttons and display panel, switch means for test cycling the carriage and the like, most of this auxiliary equipment being optional and omitted from the general combination described in view of FIGS. 18A, 18B in order to minimize the circuitry.

Certain of these additional features, however, will have particular utility in special locations, including notably an anti-fraud relay means for preventing the plug-pulling type of fraud, and a variant of the "master switch" means in the form of a remote control switch adapted to override the coin switch control, as will more fully appear in conjunction with circuit connections now to be described in view of FIG. 19, which is of the disjoined-component-and-contact variety wherein the actuating coils of relays and the like are located at positions away from the various contacts or components respectively controlled thereby in order to simplify wiring, it being important to observe that in FIG. 19 all switches (excepting the accumulator-disc switches 177, which move to the right) are shown in their starting conditions from which they are presumed to move in a clockwise direction, the power source being a line plug 299 and feed conductors L–1 and L–2. Wherever feasible, similar reference characters in FIG. 19 refer to similar parts or circuit means described in view of FIGS. 18–A, 18–B.

As heretofore explained in detail, the "normal" cycle of operation of the machine is considered as one in which the patron receives the desired goods on the first selection after depositing suitable coins, which in the example previously given involved closure of the 10-cent and 25-cent coin switches 148, 149 to effect ultimate closure of the 35-cent credit switch 155 which results in connection of power from conductor 177 via conductor 156 to the 35-cent bus bar 157 in the known manner of operation of such accumulator switches; and on pushing of the appropriate selection button, power will be applied via the selector switch 160 and the price-change switch contacts 161 to a selector coil 78A to set up its selector finger and also to pulse the trip-out coil 165 for the first interlock relay I, which will close the motor-starting contact means 166 thereof and energize the motor via conductor 167.

The #1 motor cycling cam switch contacts open at 94A and close at 94B to establish a holding circuit for the duration of the cycle and meanwhile disconnect operating power from the selection circuit while the carriage begins its outbound or ejecting excursion and in this example ("normal" cycle) ejects the desired brand of goods and in so doing shifts the supervisory gate switch or goods-delivery and sensing means to the second condition, thereby signalling the dispensing of the packet of cigarettes, this being effected by closure of the corresponding gate switch contacts at 85, for example, so that the test or supervisory gate pulse, timed to occur in this phase of the dispensing cycle by closure of gate-pulse contacts 95A–95B on the #2 cam switch, will be applied via conductors 95C, 200, the closed gate switch contacts 86, and conductor 204, to the trip-out coil 192 for the second interlock relay II, and also to junction 204C with the accumulator reset coil conductor 214 which pulses the accumulator reset coil 215, as well as the coin-collect coil 216 from junction 209 with said reset conductor 214, via conductor 210 and closed contact means 211 in the dropped condition of interlock relay I, and conductor 217 to the collect coil 216.

This particular cycle will be terminated by a resetting pulse from contact means 96A on the #3 motor cam switch (equivalent to 96, FIG. 18–B) applied via conductor 219 to the setting or latch-up coil for the first interlock relay I, restoring the latter to readiness for the next cycle; the same pulse being derived at junction 218 and transmitted via conductor 115 to the match dispensing coil 114, following which the holding circuit for the motor is finally broken at contacts 94B on the #1 motor cam switch (comparable to 94, FIG. 18–B).

If the first selection fails for lack of merchandise in the magazine selected, there will not be any "goods-delivered" signal applied by the gate switch to conductor 204 to reset the accumulator and collect the coins as aforesaid; instead, the test pulse will be applied from #2 cam switch contacts 95A–95B (as in the case of cam 95, FIG. 18–B) to conductor 200 and thence via the gate switch chain circuit conductors 201, 202 and all contacts 85 closed (because no gate opens) to condutor 205 which energizes the setting coil 190 of the second interlock relay II which now remains latched-up until a "goods-delivered" gate pulse is received, in consequence of which the second-selection or recycling circuit means will now be automatically conditioned for operation, the original cycle nevertheless going to completion, with a consequent resetting of relay I by cam switch 96 at the end of the cycle, as before, with the difference, however, that now the match coil 114 will not be pulsed owing to opening of contact means 116 on interlock relay II when the latter sets up, there being the further difference that the accumulator reset coil 215 is not pulsed at this time because no "goods-delivered" pulse has been applied from the gate switches to conductors 204 and 214 to reset the coil 215, as aforesaid; and further, the coin collection coil 216 will not be pulsed at this time for the same reasons.

As the presently-described, non-delivery, cycle approaches the end, the resetting pulse from #3 cam switch contacts 96A via conductor 219 is applied to the setting coil 164 for the first interlock relay I to lock up the same once again in readiness for the next cycle. At this time, the "Make Another Selection" lamp 172 becomes illuminated via conductor 173 and second interlock relay contacts 174, closed.

The patron now has the choice of recovering his money by actuating the return switch to close contacts 170A and pulse the coin return coil 234 via conductor 230, contact means 231 now closed on interlock relay I on resetting of the latter, conductor 232, interlock relay I contact means 208 reclosed, and conductor 233 to said return coil 234.

However, should the patron decide to make another selection and push a different selection button for a second choice without operating the coin return switch as aforesaid, the second or repeat cycle will proceed as previously described, beginning again with the tripping out of the first interlock relay I and closure of the motor starting contact means 166 thereon, from which point onward the operation would be as described for a "normal" or "goods-delivered" cycle; and in the event the second selection should likewise fail to deliver the selected goods, third, fourth, and so-on "repeat" or "second-choice" cycles may be initiated in like manner.

The circuit of FIG. 19 provides an anti-cheat relay means for eliminating the fraud perpetrated by pulling the power plug, after depositing sufficient coins to condition the machine for an otherwise legitimate operation, and then pushing a selector button and almost simultaneously pulling out the power plug 299 (or otherwise cutting off the power supply) before the motor and reduction gear means 90–91 can run long enough to operate the first cam switch and remove power from the selection circuit.

This type of fraud can result in the delivery of three and four packs for the price of one, and it is likely to be especially troublesome in those installations which include a manual cut-out switch 298 located just inside the delivery opening (51B, FIG. 4) for the convenience of the proprietor, operator, or service man. The anti-cheat relay prevents this practice by locking out the selection power until a new cycle is started.

When the machine is plugged in with interlock relay I in its normal, latched-up condition, the coil 300 of the anti-cheat relay will be energized at once from power line conductor L–1, the normally closed contacts 166X on interlock relay I, not shown in FIG. 18–B, and conductor 303. On pulling in, this relay sets up its own holding circuit at its contacts 304, and will not thereafter drop out when interlock relay I trips out in subsequent vending operations, but can be made to drop out by pulling out the power plug 299.

Contacts 305 of the anti-cheat relay control the supply of power to conductor 177 feeding the selection coil circuit, and accordingly if the power plug is pulled just after one selector button and its switch is actuated, interlock relay I will be unlatched and start the motor. But when the power plug is restored thereafter, or the power otherwise switched on again, the anti-cheat relay cannot pull in to restore power to the selection circuit at contacts 305 until an entirely new cycle is initiated and therefore the possibility of a fraudulent multiple selection is eliminated.

It may be noted that the selector buttons are intended to be provided with the usual mechanical lock-out means (not shown) of which there are numerous varieties commonly employed to prevent effective pushing of more than one button at a time; however, the anti-cheat relay and the fraud preventive lamp means RL substantially eliminate the multiple-selection type of fraud, while the shield baffle 33, previously described, blocks access to vulnerable points by means of probes.

In many territories, ordinances make it unlawful to permit the access of minors to coin-controlled cigarette machines, and proprietary intervention by remote control is necessary. In order to supervise the actuation of the machine in legitimate dispensing operations with the use of coins but under remote control, the circuit of FIG. 19 includes an additional "master switch" means in the form of a proprietary remote control switch means adapted to override the coin-controlled selector switch means 160, this feature being made optional by provision of a remote control unit with plug and socket means 315, which can be plugged in at 316, 317 for operation to apply power directly to the setting coil 190 of interlock relay II to establish conditions for the initiation of a single cycle which initially by-passes the interlock relay I operation by selector buttons after deposit of coins in such manner that the dispensing cycle will be set up as though it were a "repeat" or "second choice" cycle in the respect that relay II is set first to cut out the match dispenser and illuminate the lamp 172, and supply power to credit conductor 177.

One terminal 316 of the remote control socket is connected by conductor 318 to power line L–1, while the other socket terminal 317 connects via conductor 319 through "½ Remote" manual contacts 334, conductor 319A to setting coil 190 of interlock relay II. Plug terminals 320 and 321 respectively connect with socket terminals 316, 317 and will be shunted by remote relay contacts 322 when closed, via conductors 323 and 324 when the coil 325 of this relay is energized, as by closure of manual remote control switch contacts 326, which complete a 24-volt safety circuit via conductors 327, 328 from the secondary of a transformer 329 connecting via conductors 330, 331 to the power feed conductors L–1, L–2.

Where the remote control means is used, it is desirable to guard the selection circuit means further by provision of a manual change-over switch in the preferred form of a double-pole, single-throw toggle type of switch, the two polar sets of contacts of which are designated in FIG. 19 as "½ Remote," respectively. In its normal or non-remote condition, contacts 334 of this switch are open in series with conductors 319, 319A to the setting coil 190 of interlock relay II, while the other pole set of contacts 335 are closed and provide a shunt path around a special set of contacts 171 on interlock relay II placed in series between conductor 175 and conductor 177 to the accumulator credit switches.

Thus, when no remote control is desired in the circuit of FIG. 19, contacts 334 (½ Remote) are open, and the companion contacts 335 (½ Remote) are closed, and the latter contacts shunt contacts 171 on interlock II.

When the remote control unit is used, the toggle switch is throw to close contacts 334 and open contacts 335, so that the setting coil 190 for interlock relay II is then in the remote cable circuit with plug means 315, and special contacts 171 on interlock relay II become effective and will close when the latter relay is set. The remote unit is useful in a variety of situations, including operation in areas where minors may have access to the machine, as aforesaid.

We claim:

1. In a packet dispensing machine, the combination, with a reciprocable dispensing carriage and drive means operable in cycles for reciprocating the same in excursions from and to a home position, of: packet storage magazines arranged in a plurality of rows at a corresponding plurality of stepped levels, each row extending crosswise of the travel of the carriage, the carriage having stepped levels each corresponding to one of the rows of magazines and each disposed in said home position to underlie the bottoms of the magazines of the corresponding row and level; selectively settable dispensing means on each step level of the carriage and respectively associated with each magazine of the corresponding row and adapted to be actuated from a reset position to a set dispensing position to strip a packet from beneath the corresponding magazine on movement of the carriage outbound from home position to a predetermined discharge position; selector means for selectively actuating any dispensing means to set dispensing position; gate means at a fixed position relative to each step level of the carriage respectively and lying in a position to be engaged by any dispensing means on the appertaining level which is in dispensing position on the return travel of the carriage to reset the said dispensing means; and control means cooperable with said selector means for initiating a cycle of operation of said drive means consequent to an operation of the selector means.

2. Apparatus according to claim 1 in which said gate means comprises a gate bar extending across each carriage step level in spaced relation thereabove and pivotally supported at opposite ends to swing upwardly from a predetermined normal position on impingement therewith of a packet transported by the carriage in outbound movement, but immovable in the reverse direction from said normal position after passage of said packet and acting on reverse movement of the carriage to cause said packet to be expelled from the carriage in moving toward home position.

3. Apparatus according to claim 2 further characterized in that said carriage is provided with means positioned in blocking relation to each gate bar in the home position of the carriage to prevent movement of any gate bar from said predetermined normal position.

4. Apparatus according to claim 2 with said gate means further characterized in that each said gate bar is provided with a supervisory signalling means operable thereby at least in the swinging movement thereof to signal the passage of a packet impinging therewith.

5. Apparatus according to claim 4 with said gate means further characterized in that said signalling means includes a switch means having at least two conditions of operation, one of which corresponds to the normal position of the gate bar, and the other of which corresponds to the position thereof resulting from passage of a packet as set forth, together with a signalling circuit and circuit means connecting with said switch means and controlled by the latter responsive to both said conditions.

6. Apparatus according to claim 5 in which said signalling circuit constitutes a packet delivery checking circuit and said circuit means includes relay means connected for operation by said switch means at any gate bar to control signalling by two alternate circuits corresponding to said two conditions depending upon whether or not the gate bar is moved by a packet at a predetermined time during excursion movement of the carriage, one of said circuits corresponding to the condition in which the gate bar does not move during said predetermined time, and the other said circuit corresponding to the condition in which the gate bar does move on passage of a packet relative thereto during said carriage excursion.

7. A packet dispensing machine according to claim 1 in which said carriage is mounted on a chassis structure having a plurality of horizontal cross bearers each disposed at a level to overlie a corresponding level on the carriage in its home position, and the respective magazines of each row are conjoined as a unit and each magazine is provided with a loading entrance at its top, each said unit being provided with pivot means at its bottom rockably engaging a corresponding one of said bearers for support thereon with the magazines in a normally upright dispensing position and for tilting movement of the unit down from said position at a substantial angle to dispose the appertaining loading entrances in a predetermined access position for loading, together with cooperative stop means on the chassis and the lowermost one of said magazine units to stop the tilt of the latter at said loading access position with said lowermost unit serving as a stop for the next higher magazine unit and those still higher in tilted condition to maintain all magazine units in their respectively tilted loading positions.

8. Apparatus according to claim 7 further characterized in that said pivot means for the magazine units comprises open, channel-shaped claw means having a downwardly-facing opening adapted to receive and seat down upon one of said bearers whereby the appertaining magazine unit can be bodily seated down upon or lifted from the corresponding bearer, and when seated upon the latter can be rocked freely from and to the tilted position aforesaid.

9. The construction set forth in claim 8 further characterized in that each said magazine unit is provided at at least one end thereof with a stopping projection extending into proximity with a part of the chassis structure and the latter is provided with an overlying abutment member positioned to overlie the stopping projection of the corresponding magazine unit when the latter is in normal upright position to prevent unseating of the same by upward movement from the appertaining bearer, said abutment members each having a width relative to the width of the corresponding stopping projections in the general direction of tilting movement of the magazine unit to require a predetermined amount of such tilting from normal position to enable the stopping projection to escape blocking action of the corresponding abutment member before the magazine unit can be lifted free of its bearer.

10. Mechanism as set forth in claim 1 further characterized in that said carriage drive means comprises electric motor means, and said selectively settable dispensing means is electrically set and said control means includes cycle-control switch means actuated by said motor means and having circuit connection with said dispensing means, a starting switch means, and a relay means for operation such that each actuation of the starting switch means will cause initiation and completion of a dispensing cycle under control of said cycle control switch means in conjunction with a selective setting operation of the dispensing means.

11. Apparatus according to claim 10 further characterized in that said gate means is positioned relative to each step level to be engaged and moved a predetermined amount from a normal position by passage relative thereto of each packet ejected at the level, and there is additionally provided a repeat-cycle circuit means connected for cooperation with said cycle-initiating control means, together with a gate switch means for each step level and operable by the corresponding gate means on each packet-passing movement thereof to change circuit connections from a first to a second gate signal condition; together with a second-selection circuit means interconnecting the signal circuit connections of all gate switch means with said repeat-cycle circuit means for operation such that failure of operation of the gate switch means in any dispensing cycle to change from the first to the second gate signal circuit condition will condition the repeat-cycle circuit means for operation of said cycle-initiating control means to initiate a second dispensing cycle at the conclusion of the first dispensing cycle without necessity of a corresponding second operation of said start switch means.

12. The combination set forth in claim 10 wherein said selector means includes selectively operable selector switches and selector circuit means cooperable therewith, together with interconnection means effective when the carriage is in a predetermined position to connect said switches and circuit means with the electrically-set dispensing means on the carriage, said interconnection means comprising an array of stationary selector circuit contacts respectively connecting with said selector switches and selector circuit means and situated in predetermined juxtaposition to a part of the carriage in the home position of the latter; and a set of complementary selector contacts arranged at said carriage part for circuit-connecting engagement with corresponding contacts in said stationary array when the carriage is in said position, under which condition any desired dispensing means may be selectively set for dispensing actuation by operation of the corresponding selector switch in conjunction with initiation of a dispensing cycle as set forth.

13. The combination of claim 1 further characterized by the provision of a delivery apron extending beneath the carriage across its range of reciprocatory travel and inclined to receive and guide ejected packets to a predetermined delivery passage from the machine, together with guard means for shielding under regions of the carriage and appertaining instrumentalities from fradulent probing instrumentalities attempted to be passed from said delivery passage to said under regions of the carriage, said guard means comprising a section of said apron pivotally movable relative to the remaining portions thereof for movement from a normal position of alignment with said remaining portions, substantially in the plane thereof below said carriage, to a raised guarding position blocking said under regions and access thereto by said probing instrumentalities, together with a further drive means acting in timed coordination with said first-mentioned drive means for reciprocating the carriage to move said guard section up and down into and out of said lowered alignment and raised guarding positions in relation to the reciprocatory excursions of the carriage in such manner that the guard section is in raised guarding position before the carriage starts to move away from home position and does not begin to return to lowered position until after the carriage is substantially returned to home position.

14. In a dispensing machine, a chassis including opposite end walls having a plurality of cross bearers extending therebetween; magazine means mounted upon said bearers; a reciprocable ejecting carriage having front and rear sides flanked by opposite end portions and adapted to move beneath said magazine means for dispensing cooperation therewith as a function of reciprocatory travel therebelow and concomitant action of ejecting instrumentalities carried by the carriage; and means removably mounting said carriage on said chassis for travel as aforesaid in a direction along an axis between said end walls and comprising a pair of front and rear rollers for each said portion of the carriage, means respectively attaching each said rear roller in carriage-supporting position at a rearward part of one of said end portions, said front rollers being carried on a long axle spanning the length of the carriage between said end portions and seating in open slot means provided in said carriage end portions adjacent frontward parts thereof; and parallel track means on the inner confronting sides of said chassis end walls in which said pairs of rollers seat to support the carriage for reciprocatory travel as aforesaid, said track means permitting the rear rollers to depart therefrom in a certain direction along said axis, said carriage being removable from the chassis in said certain direction by raising the same free of said axle and thereafter moving the carriage in the direction of said axis until the rear rollers depart from the track, the carriage being installed on the chassis by manipulation which is the reverse to that described for removal.

15. The construction defined in claim 14 further characterized by the provision of motor drive means for reciprocating the carriage, said drive means including a motor-driven crank means disposed at at least one of said chassis end walls and said axle being extended through a long slot provided in said end wall and extending in parallelism with the appertaining track means for a length corresponding to the distance of reciprocatory travel of the carriage, and means drivingly interconnecting the extended portion of the axle through said long slot with said crank means such that actuation of the latter will exert reciprocatory force upon the axle and thereby reciprocate the carriage through the seating slot means connecting the carriage with said axle.

16. In a dispensing machine, at least three magazine units each including a series of stacking columns having means at their bottoms supporting a stack of packets therein and permitting lateral ejecting exit therefrom; chassis means mounting said magazine units in ascending stepped relation; an ejecting carriage and means mounting the same on said chassis means for reciprocatory dispensing excursions beneath said magazine units in dispensing cycles starting from a home position out to a dispensing position in the direction of ejecting exit of said packets and back to home position, said carriage having at least three step levels each adapted to underlie the bottom of one of the stepped magazine units in the home position of the carriage, each said step level of the carriage being provided with packet ejecting means comprising a series of vertically shiftable ejector fingers spaced serially across the appertaining step level and each disposed in alignment with one of the stacking columns in an appertaining one of said magazine units, said fingers being movable upwardly from a normally lowered non-ejecting position to an elevated ejecting position opposite the trailing end of the bottommost packet in the appertaining stacking column; electrically-actuated means movable with the carriage operable selectively to move any ejector finger to ejecting position; swinging gate means carried by the chassis to extend above and across the length of each carriage step level to be engaged by a packet of given height resting thereon, and yieldable in the direction of packet ejecting movement from a certain normal position to permit passage therebeneath of an ejected packet but immovable beyond said certain normal position in the reverse direction whereby the gate means prevents any ejected packet on the corresponding step level from returning with the carriage and is thereby effective to cause dislodgement of such packet from the carriage after passage of the gate means as an incident to return of the carriage to home position; electrically-energized driving means for reciprocating said carriage in dispensing cycles through an excursion sufficient to cause dislodgement of a packet from the carriage, as aforesaid; and operating circuit means including selector switch means, starting switch means and cycling switch means having connections with said ejector-finger elevating means, said driving means, and a source of operating power and operable responsive to actuation of the selector switch and starting switch means to initiate a dispensing cycle as aforesaid to cause ejection of a packet onto and from the carriage from any selected stacking column containing such a packet during each such cycle.

17. Dispensing apparatus comprising a movable support having at least two vertically spaced-apart and horizontally offset step levels and means mounting the support for movement back and forth in the direction of offset of said levels from a normal position in an ejecting excursion and back; magazine means mounted above each step level and respectively comprising a series of upright goods compartments extending side-by-side in a row across a corresponding step level laterally of the direction of movement of the support, each compartment having a dispensing bottom disposed at a predetermined distance above the appertaining step level; selectively actuatable goods-ejecting means for each said compartment aligned with the bottom thereof in spaced relation one to another across the appertaining step levels of the support, the ejecting means for each compartment including a member movable on selective actuation as aforesaid from an ineffective to an ejecting position relative to the bottom of the corresponding compartment to engage goods thereat and effect ejection of such goods on movement of the support from normal position a predetermined distance in ejecting excursion as aforesaid; and goods-dislodging means in relatively fixed relation to the movement of said support and extending across each step level at a predetermined vertically spaced position thereabove to be engaged by ejected goods thereon and yieldable before such goods only in the excursion movement of the support, but not in movement of the support back toward normal position, thereby causing the ejected goods to be dislodged from the support; means for selectively actuating any ejecting means as aforesaid; and means for moving the support to and from normal position in dispensing movement as aforesaid.

18. In a dispensing machine of the multiple-magazine, bottom-ejection type, the combination, with at least three upright magazines each including a series of side-by-side compartments parallel to the series of the other magazines, and respectively adapted to contain a stack of packs to be dispensed from a bottom opening therein, of: means mounting said magazines with the bottom levels of the respective compartments of each magazine after the first elevated and horizontally offset from the bottom of the preceding magazine in a mutually stepped relationship and the packs respectively contained in each compartment ejectable therefrom substantially horizontally in the general direction of the step rise; together with a carriage having a number of horizontal step levels corresponding to the number of magazines, and means mounting the carriage for back and forth movement beneath the magazines with each step level thereof spaced a certain distance beneath the bottom of the corresponding magazine and compartments thereof, said carriage having a home position in which each step level thereof underlies the bottoms of the compartments of a corresponding magazine and the carriage is movable in an ejecting excursion away from home position to displace its several step levels out of alignment with the appertaining magazine bottoms, said carriage having pack-ejecting means comprising an ejector member aligned beneath each compartment on the appertaining carriage level and means mounting the same for movement from an idle position into a releasable locked-up ejecting position to engage the bottommost pack in the appertaining compartment and push such pack out onto the corresponding carriage level as a function of excursion of the carriage from home position; said ejector members being movable in a certain reset direction for release from locked-up condition, and a pendulously movable gate means supported by means stationary relative to the carriage to extend across and above each step level transversely of carriage movement adjacent the home position of the carriage in an overlying position to be engaged by an ejected pack of predetermined height on the appertaining step level during excursion of the carriage to be moved by such pack in a yielding direction out of its path, each gate means being limited in movement reverse to said yielding direction to act as an abutment to an ejected pack on movement of the carriage toward home position, whereby to cause such ejected pack to be dislodged from the step level on which it rests, movement of the carriage to home position causing the gate means to impinge against any ejector member in ejecting position to move the same in said reset direction and release such member from locked-up condition.

19. In a dispensing machine, a reciprocable carriage having at least three horizontal step levels with an article exit in the rise between successive levels; a magazine situated above each step level to extend across the length thereof and laterally crosswise of the direction of carriage movement, each magazine having a series of compartments disposed serially in the same crosswise direction, each compartment having an article exit issuing horizontally therefrom in an ejecting direction of movement of the carriage generally toward the highest step level, the bottommost article in each compartment being exposed to engagement by pushing means aligned therewith on the appertaining carriage level for ejection from such compartment exit as a result of displacement of the pushing means responsive to movement of the carriage in said ejecting direction; electrically-actuated pushing means as aforesaid on each carriage level selectively movable into a position of ejecting alignment with the bottommost article in each compartment to engage and eject such article as aforesaid onto the appertaining step level in consequence of movement of the carriage in the ejecting direction; a movable one-way gate mounted in relatively fixed position to extend across each carriage level, each gate being yieldable in the ejecting direction to pass an ejected article in the ejecting direction of travel thereof and disposed in a normal position to be engaged by such ejected article on reverse travel with the carriage, whereby to cause dislodgement of such article from the carriage in consequence of a predetermined amount of the reverse travel of the carriage; a first operating means for selectively moving the pushing means into ejecting position as aforesaid; a second operating means for producing a cycle of movement of the carriage from a starting position beneath said magazines away therefrom a certain distance in the ejecting direction, and back through said predetermined reverse travel to starting position.

20. In a dispensing machine having a magazine with a linear series of article compartments from the bottoms of which the lowermost articles are ejected in a certain direction by pushed means aligned therewith on a support movable back and forth beneath the compartments in the direction of ejection, improvements comprising the combination with a support as aforesaid of: electrically-energized drive means for moving the support in a dispensing cycle from a starting position beneath said compartments a predetermined outbound distance in the ejecting direction and back to starting position; an operating circuit including a master switch initially operable to condition said circuit for an operating cycle, and a starting switch means connected to be operable only when the circuit is conditioned as aforesaid to energize said drive means for a cycle of operation; article-sensing means mounted adjacent said support and in a position to be operatively engaged and affected by an ejected article thereon; a goods-ejected switch operatively related with said sensing means and connected in a signalling circuit with said operating circuit and having two signalling conditions a first of which corresponds to the condition of the article-sensing means unaffected by an ejected article, and the second of which corresponds to the condition of said switch affected by engagement with an ejected article as aforesaid; a recycle circuit means having connection with said goods-ejected switch and said operating circuit and a source of supervisory signal energy controlled by said goods-ejected switch to condition said operating circuit for a second cycle of operation without necessity of first operating said master switch under the condition in which the first signalling condition is detected by said sensing means in the course of an immediately preceding operating cycle initiated dependently upon an operation of said master switch.

21. In a dispensing machine, in combination, a reciprocable ejecting carriage having at least three offset horizontal levels spaced upwardly in steps from a lowermost level; means defining a reciprocation bed for the carriage with a home position from and to which the carriage moves in ejecting excursions; means extending across and above each step level transversely of the carriage movement for storing articles in groups spaced apart crosswise of the direction of movement of the carriage; ejecting means on each carriage step level aligned with each said group and selectively operable from a non-ejecting to an ejecting condition in relation to the appertaining group and effective in ejecting condition on excursion of the carriage to engage and dislodge an article from such group for deposit on the corresponding step level during the excursion displacement of the carriage; means located in positions stationary relative to the movement of the carriage along its path to home position defining an abutment engaged by an ejected article in homeward bound movement of the carriage to cause such article to be expelled from the step level on which it rests following ejection as aforesaid; electrically actuated means energizable to actuate any ejecting means to ejecting condition; electrically energized carriage drive means operable in dispensing cycles for moving the carriage from home position in an ejecting excursion and back to home position in each cycle; and an operating circuit for the machine including a power circuit, a master switch, selector switches selectively operable to connect said power circuit with any ejecting means, and cycle control switch means connecting with said power circuit, said carriage drive means, and said master switch and operable responsive to actuation of the master switch to condition the selector switches for selecting operation and to energize the carriage drive means following operation of one selector switch to reciprocate the carriage in a dispensing cycle as aforesaid, said ejecting means being arranged and constructed in ejecting condition to engage the abutment means for the appertaining step level to be moved thereby from ejecting to non-ejecting condition as a result of movement of the carriage back toward home position.

22. In a vending machine, a reciprocable ejecting carriage having a plurality of stepped levels receding toward one of the directions of reciprocatory movement thereof, the carriage having a home position from which it moves along in an axis aligned with said one direction in an ejecting excursion to an outbound limit from which it is returned again to home position to complete an ejecting and delivery cycle; article-storing means overlying each step level of the carriage in the home position thereof; selectively operable ejecting means on each step level aligned for movement into an ejecting position when actuated to engage an article at the overlying bottom of the appertaining storing means during the ejecting excursions of the carriage to eject such article for deposit on the corresponding step level, said carriage being constructed so that each step level including the last is unobstructed along that margin thereof which is remote from the preceding level and proximate to the outbound limit of excursion so that articles lying on any level can be discharged from the carriage over said unobstructed margins; means below the carriage for receiving discharged articles and directing the same to a predetermined delivery area; discharge means adjacent each step level arranged and constructed to be engaged by an article deposited thereon by ejection as aforesaid and to obstruct retrograde movement of such article with the carriage in the return phase of movement of the latter, whereby to cause such article to be discharged from the step level onto which it has been ejected as aforesaid at the appertaining unobstructed margin; and drive means operable to move the carriage in vending cycles each comprising a reciprocation from and back to home position as aforesaid.

23. Mechanism according to claim 22 further characterized in that said discharge means comprises a gate member disposed at a distance above the appertaining step level to engage with an article of at least a predetermined height thereon and having limited freedom of movement from a normal position in a direction permitting the gate member to yield in opening movement to the passage of such an article in the direction of ejecting and excursion of the carriage but unyielding in the retrograde direction beyond said normal position, so as to block retrograde movement of an ejected article with the carriage back toward home position whereby such article is discharged from the step level onto which it has been ejected as aforesaid.

24. Mechanism according to claim 23 further characterized in that said normal position of the gate member is such that it blocks movement of the bottommost article from the storing means at the corresponding level when the carriage is in home position, and said carriage is provided with gate lock-up means at each step level disposed in a position of juxtaposition relative to the appertaining gate member to prevent movement of the latter out of normal position, whereby to block ejection of the lowermost article from any storing means unless the carriage is moved substantially from home position.

25. A vending machine according to claim 22 further characterized in that said drive means is electrically actuated, and there is further provided an operating circuit therefor including a coin-controlled master switch and a starting switch connected for operation in the order named to permit initiation by the starting switch of one vending cycle for each coin-controlled operation of said master switch, said discharge means comprising a gate member disposed at a distance above the appertaining step level to engage with an article of at least a predetermined height thereon and said gate member having limited freedom of movement from a normal position in a direction permitting the same to yield in opening movement to the passage of such an article in the direction of ejecting excursion of the carriage, but unyielding in the retrograde direction beyond said normal position, so as to block retrograde movement of an ejected article with the carriage on movement of the latter back toward home position, whereby such article is discharged from the step level onto which it has been ejected as aforesaid, said operating circuit including a gate switch for each step level and each gate switch being cooperatively related to a corresponding gate member to have at least a normal signal connection and a gate-open signal connection, said last-mentioned connections respectively corresponding to the condition in which the gate is not moved from said normal position, or is moved open by passage of an article, as set forth; together with a recycling circuit means connecting with said operating circuit and switches for each gate and controlled by said normal and gate-open signal connections respectively to condition the operating circuit for a second cycle of operation without necessity of operation of the master switch means as a condition precedent to effectively operating the starting switch a second time in those instances in which the coin-controlled initiation of an immediately preceding first cycle fails to effect an operation of a gate switch to produce the gate-open signal connection at a predetermined time during said first cycle.

26. In a machine for vending packaged goods stacked in upright magazines by action of ejecting means movable across the bottoms thereof to push the lowermost package from a sidewise exit thereon, improvements comprising, namely: a plurality, greater than two, of said magazines each including a linear series of package compartments, and means mounting the said magazines side by side with the respective series of compartments thereof extending in parallelism, one with the other, and the sidewise exits thereof facing in one certain direction and the respective bottoms of the compartments of each series after the first being stepped upwardly and outwardly in said certain direction; together with further means including an ejecting carriage having a like plurality of stepped and offset levels each adapted to closely underlie the compartment bottoms of an appertaining one of said magazines in a certain home position of the carriage; means mounting the carriage for back and forth cycles of travel in a direction generally in alignment with said certain direction in excursions away from home position to an outbound limit as a result of which each step level is displaced from beneath its corresponding magazine bottom; ejector means on each step level selectively operable with respect to any appertaining magazine compartment to engage a package at the bottom thereof and push the package in said certain direction through an appertaining sidewise exit as aforesaid as a result of the aforesaid excursion of the carriage a substantial distance toward said outbound limit whereby to lodge such package on the corresponding step level prior to reversal of the carriage in homing travel, each said cycle of excursion and homing travel constituting a vending cycle; package-restraining means associated with each step level and acting to prevent movement of any ejected package with the carriage any substantial distance back toward home position whereby the support of the carriage is caused to be withdrawn from beneath such restrained package and the latter launched into space at least by the time the carriage comes to rest in home position; means defining a package delivery station and means for receiving and gravitatingly guiding the launched packages to said station; means for selectively actuating the ejector means as aforesaid; means for moving the carriage in vending cycles as aforesaid; and operating means including a master control means and a starting means interconnecting with said ejector actuating means and said carriage moving means and requiring operation of the master control means first to condition said ejector-actuating and carriage-moving means for operation by said starting means to effect a vending cycle.

27. In a vending machine having mechanism as characterized in claim 26, a locked cabinet enclosing said mechanism and including a delivery opening located at a level below said carriage and defining said delivery station, said package receiving and guiding means comprising a downwardly-inclined baffle member underlying said carriage through its range of travel and having a lower end region terminating opposite said delivery opening and station, said baffle having a movable guard section drivingly interconnecting through a delayed action linkage with said carriage moving means for concomitant action therewith to move said guide section into a shielding position upwardly beneath the carriage away from home position, and to withdraw said guard section from shielding position after the carriage is fully home and restore said guard section to a normal condition of alignment with the stationary portion of the baffle member.

28. In a packet dispensing mechanism, a first set of packet magazines of the bottom-dispensing type arranged in a linear series with their bottoms at a predetermined uniform level; further sets of said magazines similarly arranged adjacent the first set, but each further set having the bottoms thereof situated at a predetermined higher level than the preceding set, in steps; and a single dispensing truck reciprocably movable along a linear path beneath all of said sets of magazines and provided with a plurality of correspondingly-stepped packet-receiving decks each corresponding to, and adapted to underly the bottoms of an appertaining set of said magazines at a predetermined distance therebelow; a plurality of selectively operable packet-ejecting devices arranged in series on each deck and each in position for ejecting action relative to the bottom of one of the magazines in the corresponding set and each selectively operable from a normally ineffective condition to an ejecting condition for ejection of a packet from the bottom of the appertaining magazine as a function of dispensing movement of said truck on one of its directions of reciprocation, the ejected packet being thereby lodged upon the corresponding deck; and means operative as a function of reverse movement of the truck for discharging such packet from the deck upon which it is lodged by ejection as aforesaid and including gate means disposed in relation to each deck to block movement of the ejected packet by the truck in the direction of such reverse movement thereof.

29. In a dispensing machine of the type having goods storage magazines and a movable dispensing member operable in dispensing cycles of travel from and to a home position relative to said magazines to effect ejection of goods therefrom, the combination of: selectively-operable ejector devices carried by said dispensing member and respectively provided with electrically-operated ejector-actuating means respectively operable by connection with a selection circuit means to an effective condition to cause ejection of goods from a corresponding magazine in conjunction with a cycle of travel of said dispensing member; and means for temporarily extending selective operating-circuit connections to said ejector devices only at a time when said dispensing member is in said home position, said means comprising an array of stationary contacts each corresponding to one of said ejector-actuating means and respectively adapted for connection with a goods selection-circuit means as aforesaid, said stationary contacts being mounted in juxtaposition to a particular part of said movable dispensing member which is aligned therewith in said home position thereof; and a second array of complementary contacts respectively cooperable with the contacts of said stationary array and carried at said particular part of the movable dispensing member in a condition to operatively interconnect with the corresponding contacts in said stationary array in said home position; together with operating connections extended from said complementary contacts to the corresponding ejector-actuating means, such that any of the latter may be selectively actuated by an operating signal extended thereto from said selection-circuit means provided the dispensing member is in said home position.

30. In a coin-controlled dispensing machine of the type housed in a locked cabinet and having relatively stationary goods-storage means therein and a cooperable goods-dispensing carriage movable therebeneath in dispensing cycles away from a home position to a discharge position relative to a goods-delivery means and access opening in said cabinet and back to home position whereby to effect ejection of goods from the storage means to said delivery opening in conjunction with the action of goods-ejecting means on the carriage operable in ejecting action dependently at least in part upon movement of the carriage from and to said home position in each cycle, improvements in fraud-preventive means comprising, namely: a blocking shield movably mounted in said cabinet in relation to said delivery opening and carriage to occupy a first position beneath the carriage to block access to the carriage and storage means from said delivery opening, and movable from said first position to a second position tilted beneath the carriage to receive and guide ejected goods therefrom to said delivery access opening; drive means for moving the carriage in dispensing cycles as aforesaid; and mechanism operating in timed coaction with said drive means for moving said shield to and from said first and second positions in each dispensing cycle in a manner to block access to the carriage and goods storage means in said first position while the carriage is in a predetermined range of positions at and away from the home position, and to occupy the second position only when the carriage is in a predetermined range of proximity to said home position upon return thereto near the end of each cycle, whereby to block access to the carriage and storage means from the delivery opening in all phases of each carriage-moving cycle.

31. In a dispensing machine, in combination, a bank of goods magazines, each magazine comprising a series of goods compartments arranged side-by-side in a linear row; each compartment having a goods exit at the bottom region thereof and from which goods are adapted to be expelled by an ejecting device moved in relation to the appertaining compartment bottom in a direction to displace the goods through the corresponding exit; means mounting said magazines with said linear rows in parallelism, but with the bottoms and exits of the compartments of one row disposed at relatively upwardly stepped levels one with respect to another; a unitary dispensing carriage having a plurality of relatively stepped horizontal surfaces corresponding in number to the number of magazines in said bank, and each said surface being spaced from the other upwardly in progression an amount to lie at a certain close distance below an appertaining one of said magazines when the carriage is disposed at a home position in a predetermined operative relation to the bank of magazines; means mounting said carriage in operative relation to the bank of magazines as aforesaid for movement to and from said home position, said means including carriage support means fixed beneath said bank of magazines; roller means supporting the carriage and guidedly engaging with said support means in a manner to permit reciprocation of the carriage in a linear path beneath the bank of magazines from said home position to an outward position in the direction of movement of goods from all said exits, and back to home position; and ejector means operatively associated with each carriage surface and each aligned with a corresponding one of the goods compartments in the appertaining magazine and respectively operable from a non-ejecting to an ejecting condition to effect ejection of goods from an appertaining one of said exits onto the corresponding carriage step surface as a function of cyclic travel of the carriage; and further means also operable as a function of movement of the carriage but subsequent to that movement thereof in the same cycle which effects goods ejection, as aforesaid, to dislodge the ejected goods from the corresponding step surface.

32. In a packet dispensing machine, an array comprising a plurality of upright packet-stacking compartments aligned in linearly-extending parallel rows, each compartment having a bottom exit from which a packet can be stripped by an ejector moving in a direction crosswise of the linear extent of said array to push a packet from such exit, each row of said compartments after the first being arranged with the respective bottoms thereof elevated to successively stepped levels; a goods-ejecting carriage and means mounting the same to reciprocate in goods-dispensing operations in said crosswise direction beneath the compartment bottoms of said array along the line of movement of the packets from the respective exits, said carriage having a series of horizontal shelves stepped in contiguous progression one above another and each disposed, in a home position of the carriage beneath the array, to underlie the bottoms of a corresponding row of said compartments; ejector means on each carriage shelf respectively aligned and operative for cooperation with one of the compartments of the appertaining row to effect ejection of a packet from the corresponding exit onto the corresponding carriage shelf on movement of the carriage a predetermined amount from home position in one direction in each dispensing operation of the carriage; and means mounted in relation to each carriage shelf to engage and dislodge an ejected packet thereon as a result of a predetermined movement of the carriage in another direction during the same dispensing operation.

References Cited by the Examiner

UNITED STATES PATENTS

| | | | |
|---|---|---|---|
| 2,575,129 | 11/1951 | Rubenstein | 221—110 |
| 2,643,929 | 6/1953 | Keefe | 221—110 |
| 2,693,299 | 11/1954 | Gross | 221—129 X |
| 2,863,587 | 12/1958 | Schinzel | 221—248 X |
| 2,973,075 | 2/1961 | Du Grenier et al. | 194—10 |
| 3,000,539 | 9/1961 | Danziger et al. | 221—129 |
| 3,002,653 | 10/1961 | Danziger | 221—124 |
| 3,058,613 | 10/1962 | Krakauer et al. | 221—125 X |
| 3,074,593 | 1/1963 | Krakauer et al. | 221—129 X |

RAPHAEL M. LUPO, *Primary Examiner.*

KENNETH N. LEIMER, LOUIS J. DEMBO, EVERETT W. KIRBY, *Examiners.*